US012415256B2

(12) United States Patent
Chen et al.

(10) Patent No.: US 12,415,256 B2
(45) Date of Patent: Sep. 16, 2025

(54) IMPACT TOOL

(71) Applicant: Nanjing Chervon Industry Co., Ltd., Nanjing (CN)

(72) Inventors: Shuai Chen, Nanjing (CN); Hongtao Ke, Nanjing (CN); Yang Li, Nanjing (CN); Zhiwei Feng, Nanjing (CN); Longxiang Liu, Nanjing (CN); Yongkang Wu, Nanjing (CN); Guang Li, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 83 days.

(21) Appl. No.: 18/585,513

(22) Filed: Feb. 23, 2024

(65) Prior Publication Data

US 2024/0359299 A1 Oct. 31, 2024

(30) Foreign Application Priority Data

| | | |
|---|---|---|
| Apr. 28, 2023 | (CN) | 202310489252.4 |
| Apr. 28, 2023 | (CN) | 202310493577.X |
| Apr. 28, 2023 | (CN) | 202321021084.8 |
| Apr. 28, 2023 | (CN) | 202321025625.4 |
| Aug. 11, 2023 | (CN) | 202311019899.7 |

(51) Int. Cl.
*B25B 21/02* (2006.01)
*B25F 5/00* (2006.01)

(52) U.S. Cl.
CPC ............ *B25B 21/023* (2013.01); *B25F 5/001* (2013.01)

(58) Field of Classification Search
CPC ........ B25B 21/023; B25B 21/02; B25F 5/001
See application file for complete search history.

(56) References Cited

U.S. PATENT DOCUMENTS

| | | | | |
|---|---|---|---|---|
| 2012/0211249 A1 | 8/2012 | Seith | | |
| 2018/0117745 A1* | 5/2018 | Murakami | ............ | B25D 11/04 |
| 2020/0198100 A1 | 6/2020 | Schneider | | |
| 2025/0073866 A1* | 3/2025 | Tomayko | ............... | B25B 21/02 |

FOREIGN PATENT DOCUMENTS

| | | |
|---|---|---|
| JP | 2014240108 A | 12/2014 |
| JP | 2017035772 A | 2/2017 |

* cited by examiner

*Primary Examiner* — Daniel Jeremy Leeds
(74) *Attorney, Agent, or Firm* — Greenberg Traurig, LLP

(57) ABSTRACT

An impact tool includes an output shaft for outputting torque, where the tightening torque of the output shaft to a workpiece is greater than or equal to 700 foot-pounds; and an impact assembly that provides an impact force to the output shaft. A main shaft ball groove includes a first ball groove that extends spirally about a main shaft axis and is concave on an outer surface and a second ball groove that extends spirally about the main shaft axis and is concave on the outer surface. An impact ball groove includes a third ball groove that mates with the first ball groove to accommodate the rolling ball and a fourth ball groove that mates with the second ball groove to accommodate the rolling ball. The included angle α between the first ball groove and the second ball groove is less than the included angle β between the third ball groove and the fourth ball groove.

20 Claims, 14 Drawing Sheets

IMPACT TOOL

RELATED APPLICATION INFORMATION

This application claims the benefit under 35 U.S.C. § 119 (a) of Chinese Patent Application No. 202310489252.4, filed on Apr. 28, 2023, Chinese Patent Application No. 202310493577.X, filed on Apr. 28, 2023, Chinese Patent Application No. 202321025625.4, filed on Apr. 28, 2023, Chinese Patent Application No. 202321021084.8, filed on Apr. 28, 2023, and Chinese Patent Application No. 202311019899.7, filed on Aug. 11, 2023, which applications are incorporated herein by reference in their entireties.

TECHNICAL FIELD

The present application relates to the technical field of power tools and, in particular, to an impact tool.

BACKGROUND

An impact tool can output rotary motion with a certain impact frequency. To achieve rotary motion with a certain impact frequency, the impact tool needs to include an assembly for outputting a rotary force and an impact mechanism for periodically impacting an output assembly. The impact mechanism can output rotary motion with a certain impact frequency to make the output torque large.

This part provides background information related to the present application, which is not necessarily the existing art.

SUMMARY

An impact tool includes a main shaft provided with a main shaft ball groove, where the main shaft ball groove includes a first ball groove that extends spirally about a main shaft axis and is concave on an outer surface and a second ball groove that extends spirally about the main shaft axis and is concave on the outer surface; and an impact block provided with an impact ball groove that mates with the main shaft ball groove to accommodate a rolling ball, where the impact ball groove includes a third ball groove that mates with the first ball groove to accommodate the rolling ball and a fourth ball groove that mates with the second ball groove to accommodate the rolling ball. The included angle α between the first ball groove and the second ball groove is less than the included angle β between the third ball groove and the fourth ball groove.

In some examples, the included angle α between the first ball groove and the second ball groove is less than 117°.

In some examples, an impact tool includes a housing; a motor including a drive shaft that rotates about a first axis, where the drive shaft optionally rotates in a first direction or a second direction; an output shaft for outputting torque, where the tightening torque of the output shaft to a workpiece is greater than or equal to 700 foot-pounds; and an impact assembly that provides an impact force to the output shaft.

In some examples, the impact assembly includes a main shaft driven by the motor and rotating about a main shaft axis; an impact block supported on the main shaft and rotating integrally with the main shaft; a hammer anvil mating with the impact block and struck by the impact block; and a rolling ball connecting the main shaft to the impact block.

In some examples, the included angle α between the first ball groove and the second ball groove is greater than 100° and less than 117°.

In some examples, the included angle β between the third ball groove and the fourth ball groove is greater than 118° and less than 130°.

In some examples, when the impact block rotates in the first direction, the rolling ball moves in the first ball groove and the third ball groove; and when the impact block rotates in the second direction, the rolling ball moves in the second ball groove and the fourth ball groove.

In some examples, the diameter of a portion of the main shaft with the main shaft ball groove is greater than and equal to 22 mm.

In some examples, the impact assembly further includes an elastic element that provides a force for the impact block to approach the hammer anvil, and two ends of the elastic element are separately connected to an abutting surface of the main shaft and the impact block.

In some examples, the coefficient of elasticity K of the elastic element is greater than or equal to 81 N/mm.

In some examples, the impact block reciprocates forward and backward along the main shaft axis relative to the main shaft while rotating on the main shaft, the impact block includes a first position at the farthest end of forward movement of the impact block and a second position at the farthest end of backward movement of the impact block, and the impact block located at the first position is engaged with the hammer anvil.

In some examples, when the impact block is located at the second position, the distance L2 between an end of the impact block facing the abutting surface and the abutting surface is less than or equal to 4 mm.

In some examples, the axial stroke H1 of the impact block on the main shaft is greater than or equal to 14 mm and less than or equal to 20 mm.

In some examples, the motor includes a stator and a rotor, the drive shaft is formed on or connected to the rotor, the stator includes a stator core and coil windings disposed on the stator core, and the length of the stator core is less than 18 mm.

In some examples, a displacement sensor that detects motion state information of a target part is further included, where the displacement sensor is disposed in an accommodation space; the displacement sensor is an eddy current sensor; and the target part is formed on or connected to the drive shaft, and the target part and the drive shaft move according to a preset rule.

In some examples, a controller configured to control a working state of the motor according to the motion state information provided by the displacement sensor is further included, where the motion state information includes position information of the target part, and the controller is further configured to determine the position of the rotor according to the position information of the target part.

In some examples, a battery pack is further included, where the battery pack supplies power to the motor.

In some examples, a holding portion for holding a sleeve is formed on or connected to a front end of the output shaft, and the length L1 from a rear end of the housing to a front end of the holding portion is less than or equal to 210 mm.

An impact tool includes a housing including a first housing and a second housing, where rear end surfaces of the first housing and the second housing define a rear end of the housing; and an output shaft for outputting power, where a holding portion for holding a sleeve is formed on or connected to a front end of the output shaft, and the tightening torque of the output shaft to a workpiece is greater than or equal to 700 foot-pounds. The length L1 from the rear end of the housing to a front end of the holding portion is less than or equal to 210 mm.

In some examples, an impact tool includes a motor supported by at least a first housing and a second housing and including a drive shaft for outputting power; a direct current power supply that supplies power to the motor; and an impact assembly for providing an impact force to an output shaft. The impact assembly includes a main shaft driven by the motor and rotating about a main shaft axis; an impact block supported on the main shaft and rotating integrally with the main shaft; a hammer anvil mating with the impact block and struck by the impact block; and a rolling ball connecting the main shaft to the impact block, where the main shaft is provided with a main shaft ball groove, and the impact block is provided with an impact ball groove that mates with the main shaft ball groove to accommodate the rolling ball.

In some examples, an impact tool includes a transmission assembly used for transmitting the power outputted by the drive shaft to the impact assembly and disposed between the motor and the impact assembly.

An impact tool includes a housing; and an output shaft for outputting power, where the tightening torque of the output shaft to a workpiece is greater than or equal to 700 foot-pounds. The length L1 from a rear end of the housing to a front end of the output shaft is less than or equal to 210 mm.

In some examples, an impact tool includes a motor accommodated in a housing and including a drive shaft for outputting power; and an impact assembly for providing an impact force to an output shaft. The impact assembly includes a main shaft driven by the motor and rotating about a main shaft axis; an impact block supported on the main shaft and rotating integrally with the main shaft; a hammer anvil mating with the impact block and struck by the impact block; and a rolling ball connecting the main shaft to the impact block, where the main shaft is provided with a main shaft ball groove, and the impact block is provided with an impact ball groove that mates with the main shaft ball groove to accommodate the rolling ball.

In some examples, an impact tool includes a transmission assembly used for transmitting the power outputted by the drive shaft to the impact assembly and disposed between the motor and the impact assembly.

In some examples, the housing includes a barrel at least partially accommodating the motor; and a tail housing connected to a rear side of the barrel, where the tail housing holds a rear bearing for supporting a rear end of the drive shaft, and a rear side surface of the tail housing is defined as the rear end of the housing.

In some examples, a battery pack is further included, where the battery pack supplies power to the motor.

In some examples, the weight of the impact tool without the battery pack is defined as the bare weight of the impact tool, and the ratio of the tightening torque to the bare weight of the impact tool is greater than or equal to 152 foot-pounds per pound.

A rotary power tool includes a power supply; a housing including a power supply coupling portion for connecting the power supply; a motor accommodated in the housing and including a drive shaft that rotates around a drive axis; an output shaft drivingly connected to the drive shaft and used for outputting power, where the output shaft rotates about an output axis; and a hanging assembly used for hanging the rotary power tool in a first state and including an opening for a suspended part to enter so that the hanging assembly is suspended on the suspended part. When the rotary power tool is in the first state, the included angle γ between an extension direction of the drive axis and a horizontal direction is less than or equal to 45°, and the output shaft is located on an upper side of the power supply coupling portion.

In some examples, the hanging assembly includes a mounting seat and a hook, where the mounting seat is mounted on the housing, the hook is detachably connected to the mounting seat, and the hook is provided with an opening.

In some examples, the housing includes a tail housing, a barrel, and a head housing connected in sequence, and the installation position of the mounting seat includes the barrel, the joint between the barrel and the head housing, the head housing, the joint between the barrel and the tail housing, or the tail housing.

In some examples, two mounting seats are separately provided on two sides of the barrel, two sides of the joint between the barrel and the head housing, two sides of the head housing, two sides of the joint between the barrel and the tail housing, or two sides of the tail housing.

In some examples, the mounting seat includes a first assembly portion, the hook includes a second assembly portion and a hook body, the second assembly portion is detachably connected to the first assembly portion, the hook body includes a storage state and a hanging state, and the hook body in the storage state is close to the housing.

In some examples, a device accessory of the second assembly portion is selectively mounted on the mounting seat through the first assembly portion.

In some examples, the device accessory includes a belt clip, a cord, or a bit clip.

In some examples, the mounting seat includes connecting portions connected to the housing through fasteners.

In some examples, the housing includes a barrel and a head housing, and the fastener simultaneously connects the barrel and the head housing to the mounting seat.

In some examples, the housing includes a grip disposed on a lower side, and the hanging assembly is higher than the grip.

A rotary power tool includes a power supply; a housing including a power supply coupling portion for connecting the power supply; a motor accommodated in the housing and including a drive shaft that rotates around a drive axis; an output shaft drivingly connected to the drive shaft and used for outputting power, where the output shaft rotates about an axis of the output shaft; and a hanging assembly used for hanging the rotary power tool in a first state and including a mounting seat and a body portion, where the mounting seat is mounted on a side of the housing. When the rotary power tool is in the first state, the output shaft is located on an upper side of the power supply coupling portion.

A rotary power tool includes a housing including a main housing and a grip for holding; a motor accommodated in the main housing and including a drive shaft that rotates about a drive axis; an output shaft drivingly connected to the drive shaft and used for outputting power, where the output shaft rotates about an output axis; a main switch for controlling the motor; and a first mounting portion for connecting a lanyard, where the first mounting portion is disposed at a position where the main housing and the grip are coupled, and the first mounting portion is close to a rear end of the main housing.

In some examples, the first mounting portion is closer to the drive shaft relative to the main switch.

In some examples, the main housing includes a barrel, a head housing, and a tail housing connected in sequence, and the grip is at least partially located below the barrel.

In some examples, the housing includes a handle housing located on a lower side of the barrel, and the grip is located in the middle of the handle housing.

In some examples, the rotary power tool includes a first mount, the first mount includes a first fixing portion and a first mounting portion, the first mounting portion includes a first lanyard hole, and the first mount is connected to the handle housing through the first fixing portion.

In some examples, the handle housing includes a left handle housing and a right handle housing that are screwed together, and the first mount is sandwiched between the left handle housing and the right handle housing.

In some examples, the tail housing is disposed at the rear end of the main housing, and along a direction of the drive axis, a rear end of the first mount does not extend beyond a rear end of the tail housing.

In some examples, the first mount partially overlaps the barrel along a direction perpendicular to the drive axis.

In some examples, the rotary power tool further includes a battery pack for supplying power to the motor, a power supply coupling portion is disposed at a lower part of the grip, and the power supply coupling portion is coupled with the battery pack.

In some examples, the rotary power tool further includes a second mounting portion, a power supply coupling portion is disposed at a lower part of the grip, the second mounting portion is located on a rear side of the power supply coupling portion, and a lanyard is mounted on the first mounting portion or the second mounting portion.

In some examples, the target part is a metal part.

In some examples, the eddy current sensor includes a transmitting coil and a receiving coil, where the transmitting coil emits an alternating excitation signal to generate an alternating magnetic field during the operation of the motor, and the receiving coil receives an electrical signal generated by the movement of the target part in the alternating magnetic field and detects the position information of the target part according to the electrical signal.

In some examples, the alternating excitation signal emitted by the transmitting coil is a sinusoidal signal, the electrical signal received by the receiving coil is a cosine signal, and the eddy current sensor determines the position information of the target part according to the sinusoidal signal and the cosine signal.

In some examples, a first circuit board on which the transmitting coil and the receiving coil of the eddy current sensor are disposed and a second circuit board on which the controller is disposed are further included.

In some examples, along the direction of the drive axis, the motor, the target part, and the first circuit board are arranged in sequence.

In some examples, the first circuit board is fixed on an inner wall of the housing.

In some examples, the eddy current sensor outputs a corresponding signal to the controller by demodulating and processing the received motion state information of the target part.

DETAILED DESCRIPTION

Figure 1:
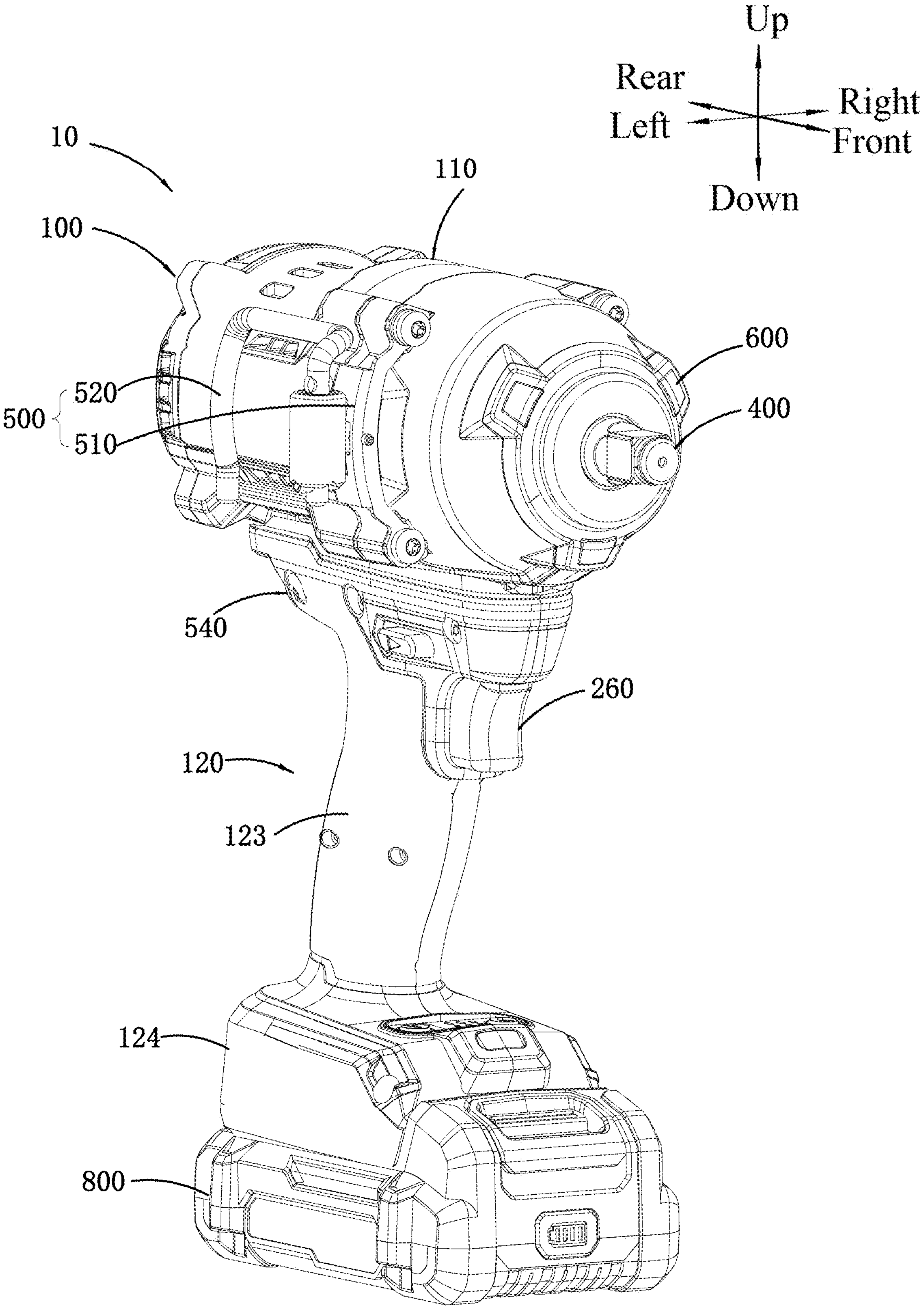
FIG. 1 is a structural view of an impact tool from a first angle according to an example of the present application.

Before any examples of this application are explained in detail, it is to be understood that this application is not limited to its application to the structural details and the arrangement of components set forth in the following description or illustrated in the above drawings.

In this application, the terms “comprising”, “including”, “having” or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase “comprising a . . . ” does not preclude the presence of additional identical elements in the process, method, article, or device comprising that element.

In this application, the term “and/or” is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.).

To clearly illustrate technical solutions of the present application, an upper side, a lower side, a left side, a right side, a front side, and a rear side are defined in the drawings of the specification.

Figure 2:
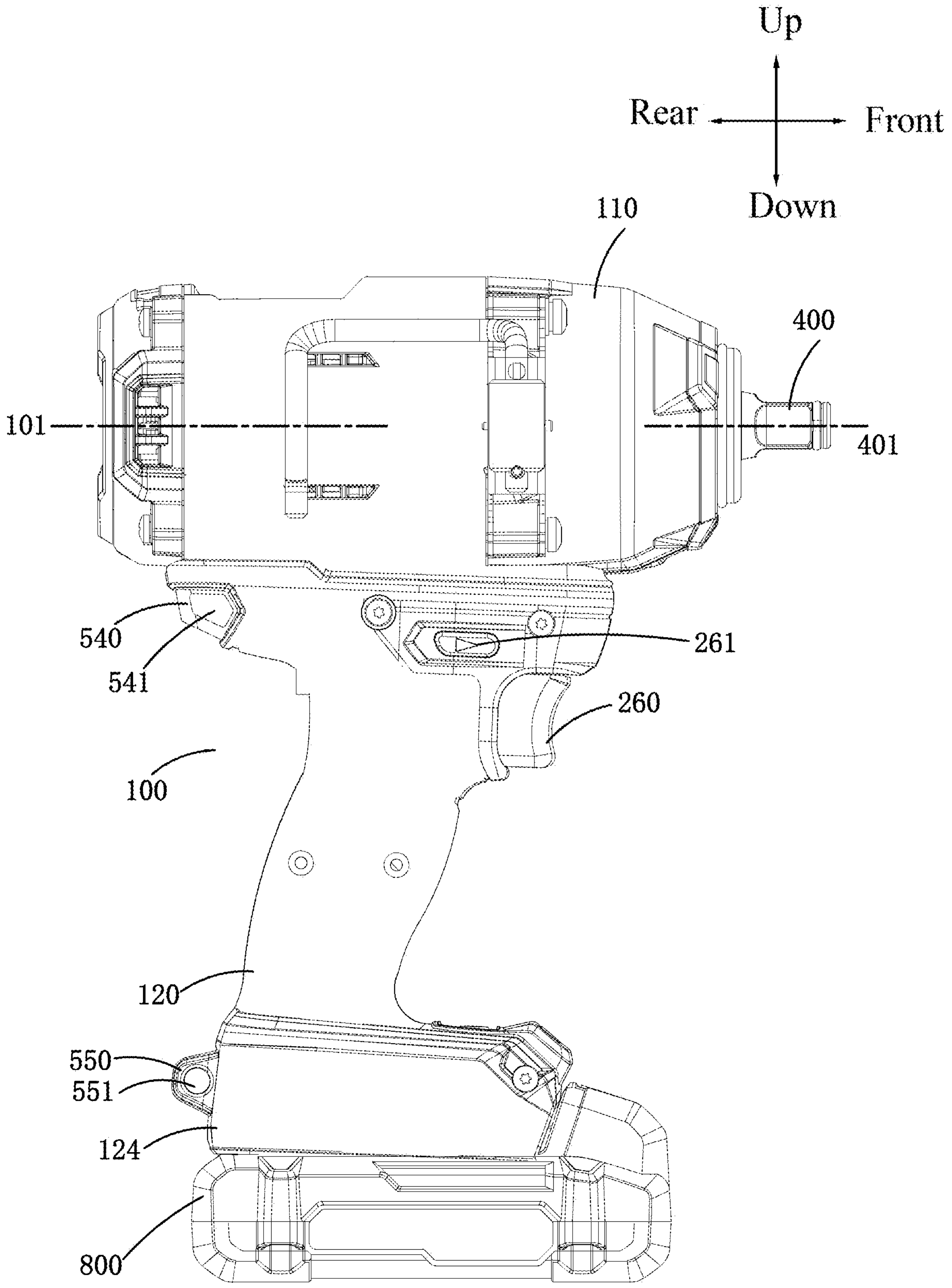
FIG. 2 is a structural view of an impact tool from a second angle according to an example of the present application.

FIGS. 1 to 20 show a rotary power tool according to an example of the present application. As shown in FIGS. 1 and 2, in this example, the rotary power tool is an impact tool. For example, the impact tool is an impact wrench 10. It is to be understood that in other alternative examples, depending on the work accessory connected to the front end, the impact tool may be an impact drill, an impact screwdriver, or the like. In other alternative examples, the rotary power tool may be a drill, a screwdriver, or the like.

In this example, the impact wrench 10 includes a power supply, a housing 100, a motor 200, an output shaft 400, an impact assembly 300, a transmission assembly 270, and a hanging assembly 500. The power supply is used for supplying power to the motor 200. In this example, the power supply is a direct current power supply 800. In this example, the direct current power supply 800 is a battery pack, and the battery pack mates with a corresponding power supply circuit to supply power to the electrical components in the impact wrench 10. It is to be understood by those skilled in the art that the power supply is not limited to the scenario where the direct current power supply 800 is used, and the power may be supplied to the circuit elements through mains power, an alternating current power supply, or a combination of mains power and the battery pack in conjunction with the corresponding rectifier circuit, filter circuit, and voltage regulator circuit.

In this example, the power supply is the battery pack 800. In the following description, the power supply is replaced by the battery pack 800, which is not intended to limit the present application. In this example, the battery pack 800 may be a lithium battery pack, a solid-state battery pack, or a pouch battery pack. In some examples, the nominal voltage of the battery pack 800 is greater than or equal to 18 V. In some examples, the nominal voltage of the battery pack 800 is 24 V or 36 V, where the weight of the impact wrench 10 without the battery pack 800 is defined as the bare weight of the impact wrench 10.

The motor 200 is at least partially accommodated in the housing 100. The motor 200 includes a drive shaft 210 that rotates about a drive axis 101. In this example, the motor 200 is specifically an inrunner. In the following description, the motor is replaced by the electric motor 200, which is not intended to limit the present application.

Figure 3:
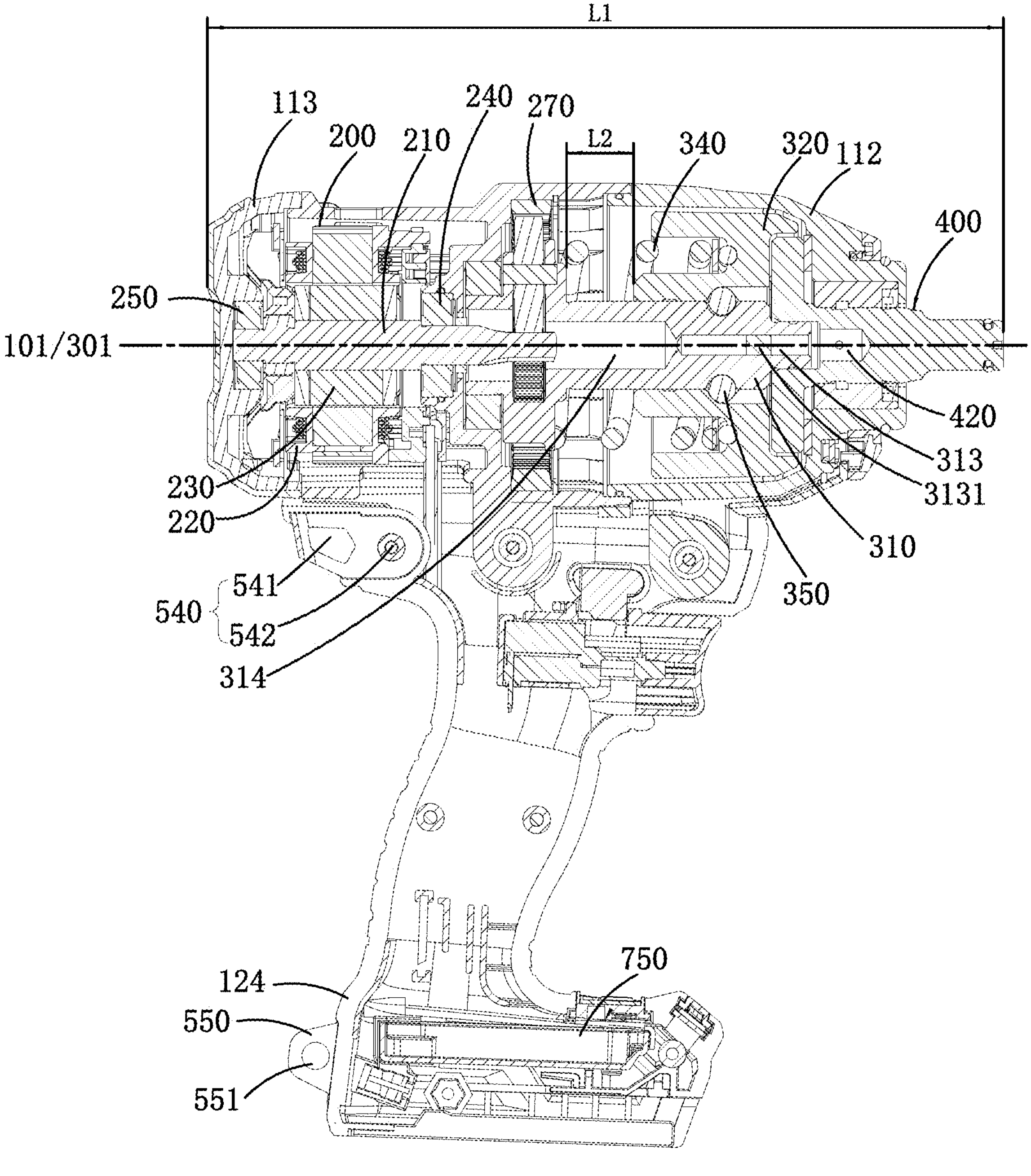
FIG. 3 is a sectional view of an impact tool according to an example of the present application, where an impact block is located at a first position.

As shown in FIG. 3, the electric motor 200 includes a stator 220 and a rotor 230, and the drive shaft 210 is formed on or connected to the rotor 230. The stator 220 includes a stator core and coil windings disposed on the stator core. Two ends of the drive shaft 210 extend from the rotor 230. The front end of the drive shaft 210 is supported by a front bearing 240, and the rear end of the drive shaft 210 is supported by a rear bearing 250. In this example, the length of the stator core, that is, the stack length of the electric motor 200, is less than 18 mm. The drive shaft 210 optionally rotates in a first direction or a second direction, where the first direction and the second direction are opposite. That is to say, the electric motor 200 optionally performs forward rotation and reverse rotation.

As shown in FIGS. 1 to 6, the housing 100 includes a body housing 110 and a handle housing 120. The inner wall surface of the body housing 110 surrounds an accommodation space, and the electric motor 200, the transmission assembly 270, the output shaft 400, and the impact assembly 300 are all at least partially disposed in the accommodation space. In this example, the body housing 110 includes a tail housing 113, a barrel 111, and a head housing 112 connected in sequence. That is to say, the body housing 110 has a cylindrical multi-section housing structure. In this example, the tail housing 113 holds the rear bearing 250 for supporting the rear end of the drive shaft 210, and the rear side surface of the tail housing 113 is defined as the rear end of the housing 100.

The handle housing 120 further includes a grip 123 formed on or connected to the body housing 110. A power supply coupling portion 124 for connecting the battery pack 800 is formed on or connected to the grip 123. The battery pack 800 is detachably connected to the power supply coupling portion 124. In this example, the battery pack 800 is detachably connected to the power supply coupling portion 124, that is, the battery pack 800 is detachably connected to the grip 123. The handle housing 120 and the body housing 110 have a split structure and are connected through fasteners. In some examples, the power supply coupling portion 124 for connecting the battery pack 800 is formed on or connected to the handle housing 120, and the battery pack 800 is detachably connected to the power supply coupling portion 124.

In some examples, the housing 100 includes a first housing and a second housing, and rear end surfaces of the first housing and the second housing define the rear end of the housing 100. The electric motor 200 is supported by at least the first housing and the second housing. That is to say, the housing 100 includes a left half housing and a right half housing that can be spliced together, a front half housing and a rear half housing that can be spliced together, or an upper half housing and a lower half housing that can be spliced together.

In some examples, the body housing 110 includes a first housing and a second housing, and rear end surfaces of the first housing and the second housing define the rear end of the housing 100. The electric motor 200 is supported by at least the first housing and the second housing. That is to say, the body housing 110 includes a left half housing and a right half housing that can be spliced together, a front half housing and a rear half housing that can be spliced together, or an upper half housing and a lower half housing that can be spliced together. The handle housing 120 and the body housing 110 are connected to form the housing 100.

Figure 13:
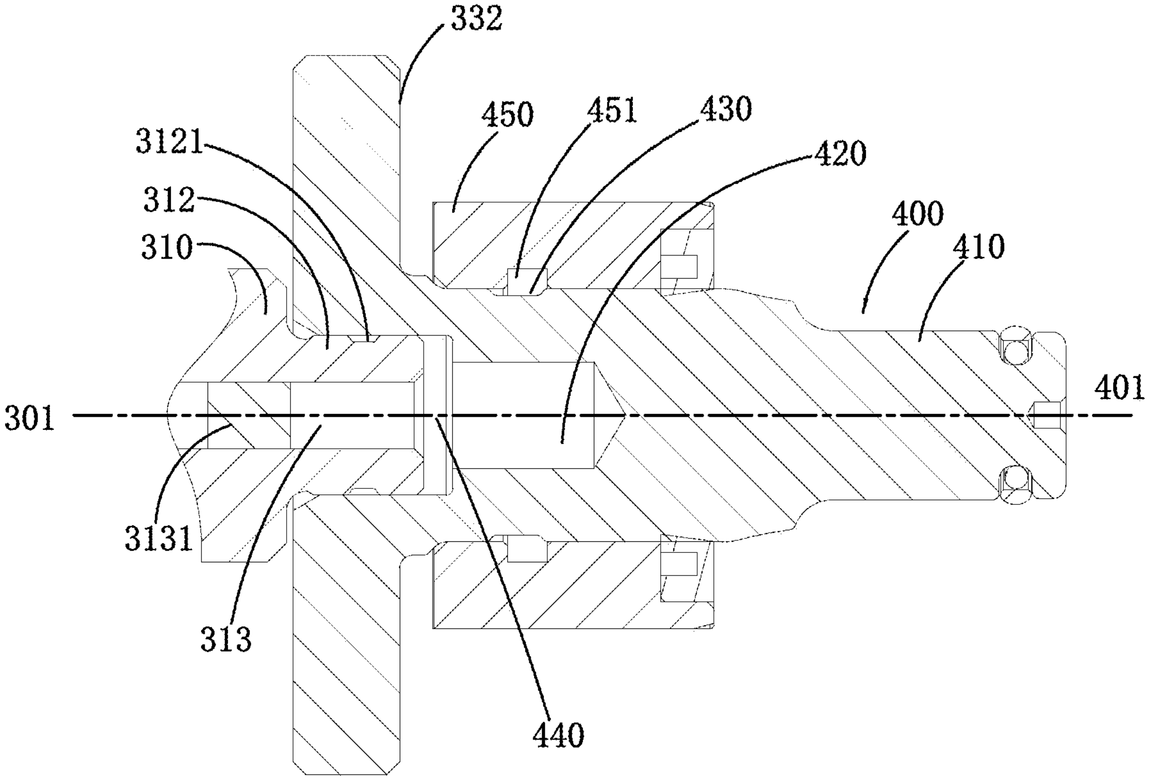
FIG. 13 is an assembly schematic view of an output shaft and a main shaft according to an example of the present application.
Figure 14:
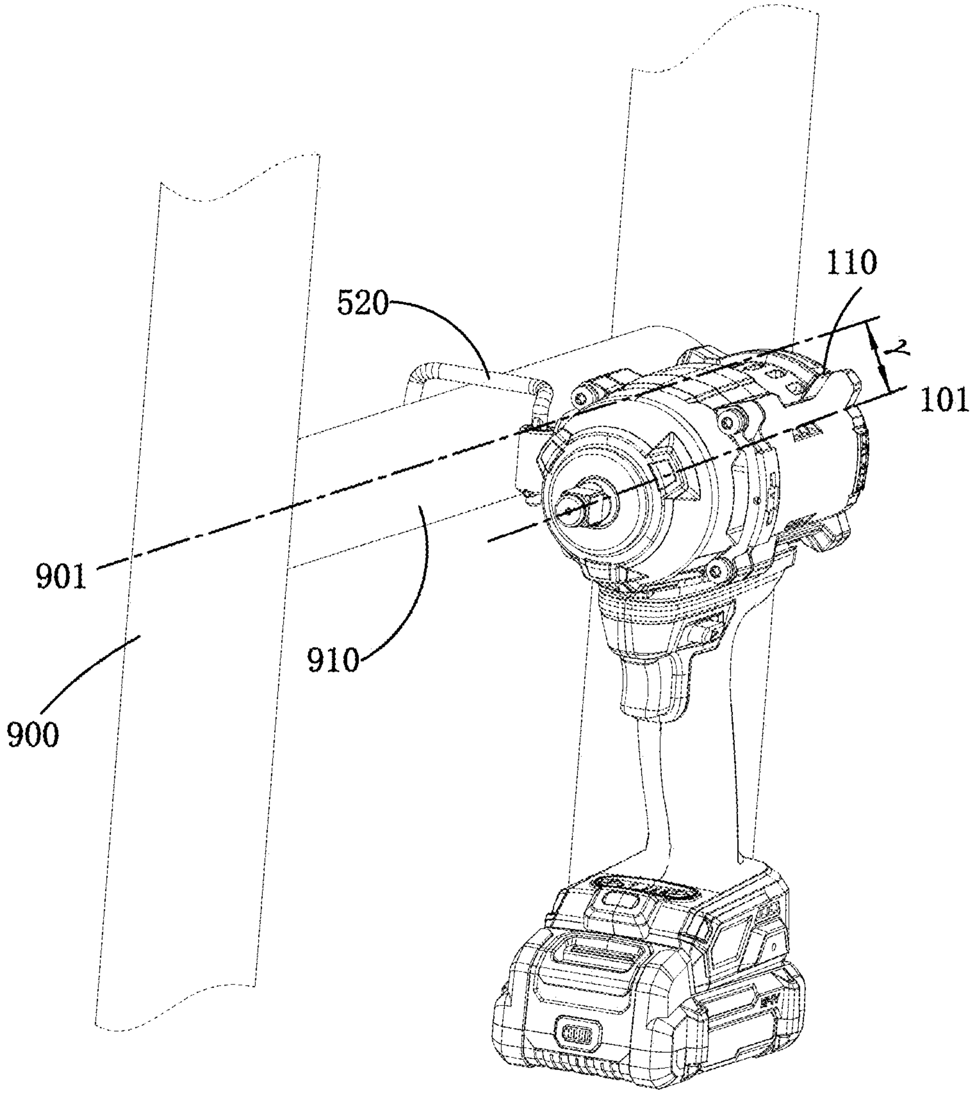
FIG. 14 is a structural view of an impact tool and a suspended part according to an example of the present application.

An output mechanism includes the output shaft 400 for connecting the work accessory and driving the work accessory to rotate. As shown in FIG. 13, a holding portion 410 for holding a sleeve is formed on or connected to the front end of the output shaft 400. In other alternative examples, a clamping portion is disposed at the front end of the output shaft 400 and can clamp corresponding work accessories, such as screwdrivers or drill bits, when implementing different functions.

As shown in FIGS. 1 to 4, the output shaft 400 is used for outputting power. The output shaft 400 rotates about an output axis 401. In this example, the drive axis 101 coincides with the output axis 401. In other alternative examples, the drive axis 101 and the output axis 401 are parallel to each other but do not coincide with each other. In other alternative examples, a certain angle exists between the drive axis 101 and the output axis 401.

As shown in FIG. 3, the transmission assembly 270 is disposed between the electric motor 200 and the impact assembly 300 and used for transmitting power between the drive shaft 210 and the impact assembly 300. In this example, the transmission assembly 270 is decelerated by a planet gear. The working principle according to which the planet gear performs the deceleration and the deceleration implemented by the transmission assembly 270 have been completely disclosed to those skilled in the art. Therefore, a detailed description is omitted herein for the brevity of the specification.

As shown in FIGS. 3 and 4 and FIGS. 7 to 13, the impact assembly 300 is used for providing an impact force to the output shaft 400. The impact assembly 300 includes a main shaft 310, an impact block 320 sleeved on the circumference of the main shaft 310, a hammer anvil 330 disposed at the front end of the impact block 320, and an elastic element 340. The hammer anvil 330 is connected to the output shaft 400. In this example, the hammer anvil 330 includes an anvil 331, and the output shaft 400 is disposed at the front end of the anvil 331. It is to be understood that the anvil 331 and the output shaft 400 may be integrally formed or separately formed as independent parts. The impact block 320 is driven by the main shaft 310, and the hammer anvil 330 mates with the impact block 320 and is struck by the impact block 320. A pair of radially symmetrical first end teeth 323 are convexly disposed on the front end surface of the impact block 320. A pair of radially symmetrical second end teeth 332 are convexly disposed on the rear end surface of the anvil 331.

The elastic element 340 is disposed between the impact block 320 and an abutting surface 315 of the main shaft 310 and used for providing a force for the impact block 320 to approach the hammer anvil 330. In this example, the elastic element 340 is a coil spring.

The impact assembly 300 further includes a rolling ball 350. The rolling ball 350 connects the impact block 320 to the main shaft 310. In this example, the rolling ball 350 is a steel ball. As shown in FIGS. 7 to 12, a main shaft ball groove 311 is formed on the outer surface of the main shaft 310. An impact ball groove 321 that mates with the main shaft ball groove 311 to accommodate the rolling ball 350 is disposed on the impact block 320. The main shaft ball groove 311 includes a first ball groove 3111 and a second ball groove 3112 that are spirally concave around a main shaft axis 301. The impact ball groove 321 includes a third ball groove 3211 that mates with the first ball groove 3111 to accommodate the rolling ball 350 and a fourth ball groove 3212 that mates with the second ball groove 3112 to accommodate the rolling ball 350. When the impact block 320 rotates in the first direction, that is, the forward rotation direction of the electric motor 200, the rolling ball 350 moves in the first ball groove 3111 and the third ball groove 3211. When the impact block 320 rotates in the second direction, that is, the reverse rotation direction of the electric motor 200, the rolling ball 350 moves in the second ball groove 3112 and the fourth ball groove 3212. The included angle $\alpha$ between the first ball groove 3111 and the second ball groove 3112 is different from the included angle $\beta$ between the third ball groove 3211 and the fourth ball groove 3212. In this example, the included angle $\alpha$ between the first ball groove 3111 and the second ball groove 3112 is less than the included angle $\beta$ between the third ball groove 3211 and the fourth ball groove 3212, and the included angle α between the first ball groove 3111 and the second ball groove 3112 is less than 117°. The main shaft axis 301 coincides with the drive axis 101. In other alternative examples, the drive axis 101 and the main shaft axis 301 are parallel to each other but do not coincide with each other.

In some examples, the included angle α between the first ball groove 3111 and the second ball groove 3112 is greater than 100° and less than 117°. In other examples, a is greater than 100° and less than 115°. In some examples, the included angle β between the third ball groove 3211 and the fourth ball groove 3212 is greater than 118° and less than 130°. In other examples, β is greater than 118° and less than 125°.

The main shaft ball groove 311 and the impact ball groove 321 both have semicircular groove bottoms. The rolling ball 350 straddles the impact ball groove 321 and the main shaft ball groove 311. The impact ball groove 321 and the main shaft ball groove 311 jointly form a ball channel. The rolling ball 350 is disposed between the impact block 320 and the main shaft 310 and is embedded in the ball channel so that the main shaft 310 can drive the impact block 320 to rotate through the rolling ball 350, and the impact block 320 mates with the hammer anvil 330 to drive the hammer anvil 330 to rotate, thereby further driving the output shaft 400 to rotate.

In the related art, the impact block 320 is sleeved on the outer side of the main shaft 310. Therefore, the diameter of a plane where the impact ball groove 321 is located is greater than the diameter of a plane where the main shaft ball groove 311 on the main shaft 310 is located. Moreover, when the main shaft axis 301 is used as a reference, the main shaft ball groove 311 disposed on the main shaft 310 is concave inward, which is equivalent to the following: the main shaft ball groove 311 is machined toward the main shaft axis 301, and the impact ball groove 321 disposed on the impact block 320 is machined in a direction away from the main shaft axis 301. The distance at which the rolling ball 350 moves in the main shaft ball groove 311 and the impact ball groove 321 is a function of the diameter of the part where the ball groove is located, the radius of the rolling ball 350, and the included angle of the ball groove. In the related art, when the included angle α between the first ball groove 3111 and the second ball groove 3112 is the same as the included angle β between the third ball groove 3211 and the fourth ball groove 3212, the available length of the main shaft ball groove 311 is greater than the available length of the impact ball groove 321, that is to say, the main shaft ball groove 311 is not fully utilized. In the present application, the included angle α between the first ball groove 3111 and the second ball groove 3112 is different from the included angle β between the third ball groove 3211 and the fourth ball groove 3212. The included angle α between the first ball groove 3111 and the second ball groove 3112 is less than the included angle β between the third ball groove 3211 and the fourth ball groove 3212, which is equivalent to increasing the distance, that is, the length, of the impact ball groove 321. The axial distance of the main shaft ball groove 311 along the main shaft axis 301 has a relatively large influence on the impact movement stroke of the impact block 320. Therefore, the utilization rate of the main shaft ball groove 311 can be improved, which is more conducive to improving the output tightening torque of the impact wrench 10. In this manner, the output stability and reliability of the product can be improved. In the present application, while the ball channel is fully utilized, the included angle α between the first ball groove 3111 and the second ball groove 3112 is reasonably limited such that the relatively small included angle α further increases the axial distance of the main shaft ball groove 311 along the main shaft axis 301 and increases the impact movement stroke of the impact block 320.

Figure 12:
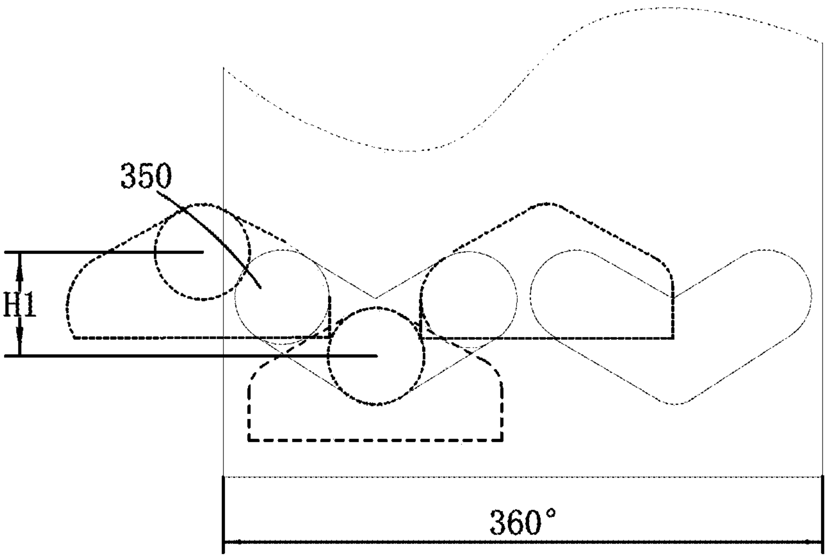
FIG. 12 is a schematic view illustrating the motion relationship between a main shaft ball channel, an impact ball channel, and a rolling ball according to an example of the present application and illustrates the total axial stroke of the impact block provided by a main shaft in FIG. 10.

As shown in FIG. 12, H1 denotes the total axial stroke of the impact block. The total axial stroke H1 of the impact block is the sum of the axial distance at which the rolling ball 350 moves in the main shaft ball groove 311 and the axial distance at which the rolling ball 350 moves in the impact ball groove 321. In this example, the total axial stroke H1 of the impact block is less than or equal to 20 mm and greater than 14 mm. In some examples, the total axial stroke H1 of the impact block is less than or equal to 19 mm and greater than 14 mm. In some examples, the total axial stroke H1 of the impact block is less than or equal to 18 mm and greater than 14 mm. In some examples, the total axial stroke H1 of the impact block is less than or equal to 17 mm and greater than 14 mm.

In this example, the diameter of a portion of the main shaft 310 with the main shaft ball groove 311 is greater than and equal to 22 mm. In some examples, the diameter of a portion of the main shaft 310 with the main shaft ball groove 311 is greater than and equal to 23 mm.

The diameter of the main shaft ball groove 311 of the main shaft 310 is increased so that the axial distance of the main shaft ball groove 311 along the main shaft axis 301 is further increased and the impact movement stroke of the impact block 320 is increased.

In the preceding technical solutions, the utilization rate of the main shaft ball groove 311 of the main shaft 310 is improved without increasing the length of the main shaft 310, and the included angle of the main shaft ball groove 311 and the included angle of the impact ball groove 321 are optimized so that the impact movement stroke of the impact block 320 is increased and the output tightening torque of the impact wrench 10 is increased.

In this example, the helix angle of the first ball groove 3111 is equal to the helix angle of the second ball groove 3112. In this manner, the main shaft 310 rotating at the same rotational speed in the first direction or the second direction has the same impact frequency.

Figure 4:
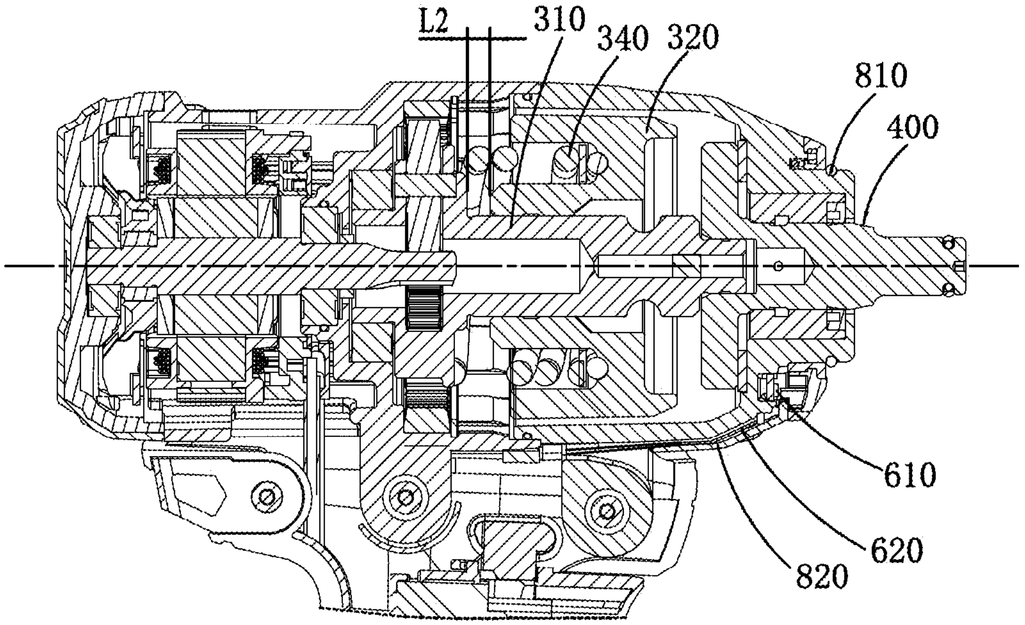
FIG. 4 is a sectional view of an impact tool according to an example of the present application, where an impact block is located at a second position.
Figure 5:
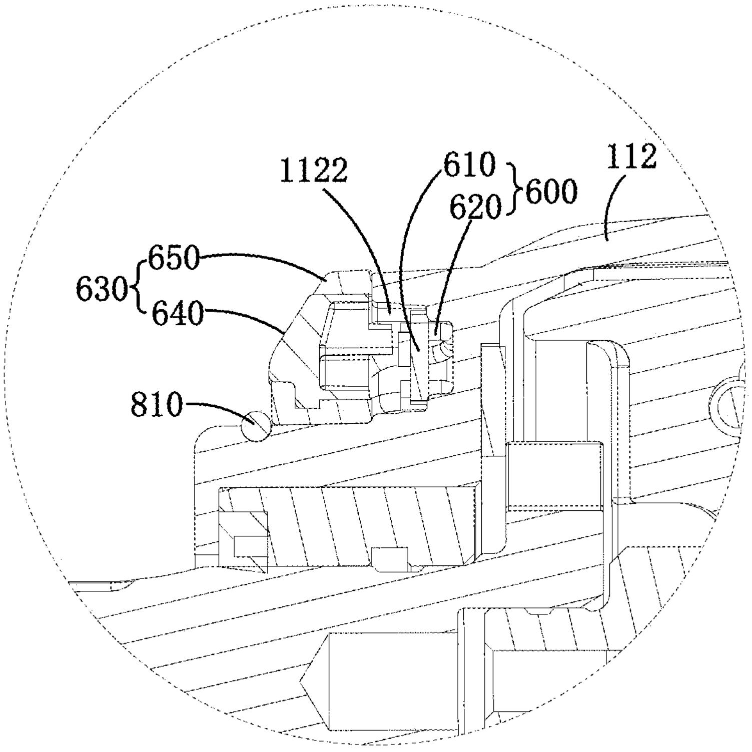
FIG. 5 is a structural view of an illumination element according to an example of the present application.

In the working process of the impact wrench 10, the impact block 320 reciprocates forward and backward along the main shaft axis 301 of the main shaft 310 relative to the main shaft 310 while rotating on the main shaft 310. The impact block 320 includes a first position at the farthest end of forward movement of the impact block 320 shown in FIG. 3 and a second position at the farthest end of backward movement of the impact block 320 shown in FIG. 4. The impact block 320 moving to the first position is engaged with the hammer anvil 330. The distance L2 between an end of the impact block 320 facing the abutting surface 315 and the abutting surface 315 is limited. As shown in FIG. 4, when the impact block 320 moves to the second position, the distance L2 between the end of the impact block 320 facing the abutting surface 315 and the abutting surface 315 is less than or equal to 4 mm. In some examples, when the impact block 320 moves to the second position, the distance L2 between the end of the impact block 320 facing the abutting surface 315 and the abutting surface 315 is less than or equal to 3 mm. In some examples, when the impact block 320 moves to the second position, the distance L2 between the end of the impact block 320 facing the abutting surface 315 and the abutting surface 315 is less than or equal to 2 mm.

In the related art, when the impact block 320 moves to the second position, the distance margin between the end of the impact block 320 facing the abutting surface 315 and the abutting surface 315 is relatively large. In this manner, the insufficient coefficient of elasticity K of the spring or the spring structural problem is avoided, and the spring is prevented from being compressed to too short and damaged. In the present application, the coefficient of elasticity K of the spring is greater than or equal to 81 N/mm so that the spring has sufficient capacity to resist the compression of the impact block 320. Therefore, in the present application, when the impact block 320 moves to the second position, the distance L2 between the end of the impact block 320 facing the abutting surface 315 and the abutting surface 315 is less than or equal to 4 mm. According to the relevant product dimensions, the axial length can be shortened by 6 mm to 7 mm. In some examples, the coefficient of elasticity K of the spring is greater than or equal to 85 N/mm. In some examples, the coefficient of elasticity K of the spring is greater than or equal to 90 N/mm.

Figure 8:
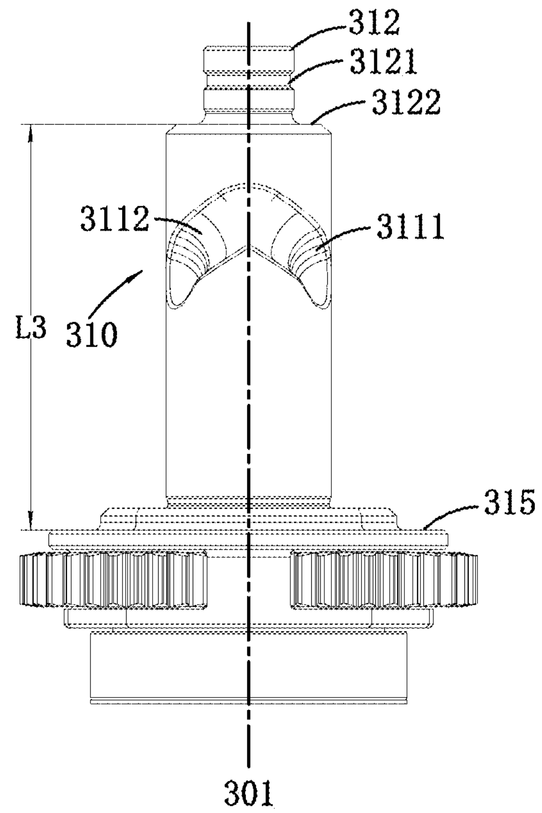
FIG. 8 is a structural view of a main shaft according to an example of the present application.
Figure 9:
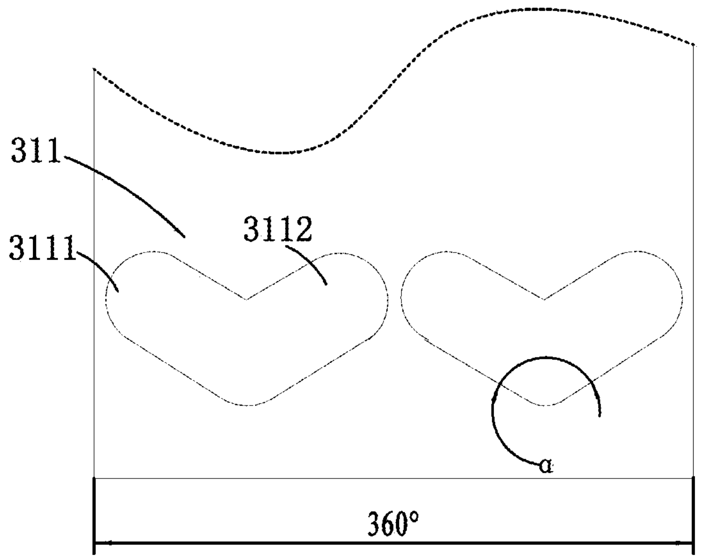
FIG. 9 is an expansion view of a main shaft ball channel according to an example of the present application.
Figure 10:
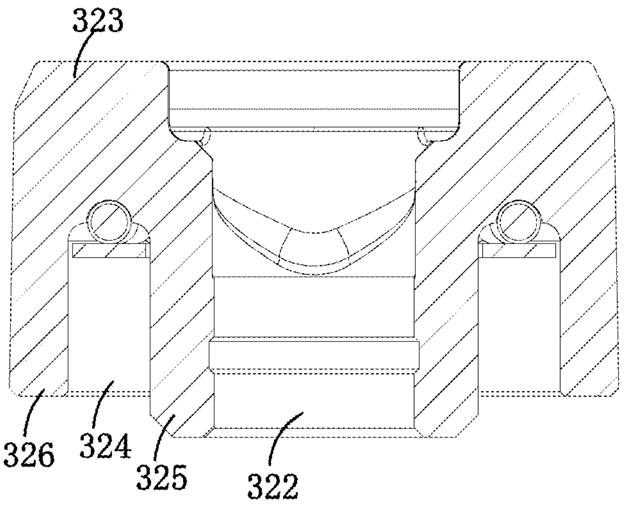
FIG. 10 is a structural view of an impact block according to an example of the present application.
Figure 11:
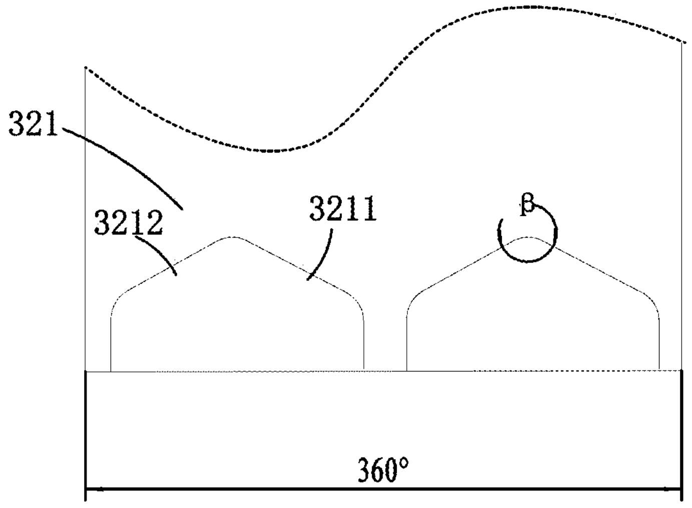
FIG. 11 is an expansion view of an impact ball channel according to an example of the present application.

As shown in FIGS. 3, 8, and 13, a connecting shaft 312 is disposed at an end of the main shaft 310 facing the output shaft 400, the outer circumference of the connecting shaft 312 is provided with a first annular groove 3121, the output shaft 400 is provided with a connecting groove 440, and the connecting shaft 312 is rotatably disposed in the connecting groove 440. In this manner, it is ensured that the output shaft 400 is radially limited. The diameter of the connecting shaft 312 is less than the diameter of the main shaft 310, and the diameter of the main shaft 310 is greater than the diameter of the connecting groove 440, thereby preventing the output shaft 400 from moving backward. The main shaft 310 is provided with a second abutting surface 3122 that abuts against the hammer anvil 330. The connecting shaft 312 and the second abutting surface 3122 form a shaft shoulder structure, and the diameter of the second abutting surface 3122 is greater than the diameter of the connecting shaft 312. The second abutting surface 3122 is basically perpendicular to the main shaft axis 301. In this example, as shown in FIG. 8, the distance L3 between the second abutting surface 3122 and the abutting surface 315 of the main shaft 310 is less than or equal to 60 mm. In some examples, the distance L3 between the second abutting surface 3122 and the abutting surface 315 of the main shaft 310 is less than or equal to 59 mm, 58 mm, 57 mm, 56 mm, or 55 mm. Since when the impact block 320 moves to the second position, the distance L2 between the end of the impact block 320 facing the abutting surface 315 and the abutting surface 315 is reduced, the axis length of the part of the main shaft 310 where the impact block 320 moves is reduced. In this manner, the overall axial length is reduced.

In this example, as shown in FIGS. 3 to 10, the impact block 320 is provided with a mounting groove 324 along the direction of the main shaft axis 301, the elastic element 340 is partially located in the mounting groove 324, an end of the elastic element 340 abuts against the groove bottom of the mounting groove 324, and the other end of the elastic element 340 abuts against the abutting surface 315 of the main shaft 310. In this manner, the length of the impact block 320 and the length of the elastic element 340 partially overlap, thereby reducing the overall axial length of the impact wrench 10. When the impact block 320 is at the second position, the compression amount of the spring is the maximum. The mounting groove 324 is annular and surrounds the outer circumference of the impact ball groove 321. The spring is partially located in the mounting groove 324 and abuts against the groove bottom of the mounting groove 324. In this manner, a certain gap exists between the spring and the main shaft 310 to avoid interference. In other examples, multiple mounting grooves 324 may be provided. The multiple mounting grooves 324 are evenly distributed around the main shaft axis 301, and one spring is disposed in each mounting groove 324.

In this example, at least two main shaft ball grooves 311 are provided, and the at least two main shaft ball grooves 311 are evenly distributed around the main shaft axis 301 on the outer circumference of the main shaft 310. In this manner, power is transmitted between the main shaft 310 and the impact block 320 through two rolling balls 350, thereby improving the stability of power transmission, which is conducive to increasing the impact strength of the impact block 320 and the torque of the output shaft 400.

As shown in FIGS. 3 to 10, the impact block 320 is provided with a mounting channel 322, and the mounting channel 322 is sleeved on the main shaft 310. The opening of the mounting groove 324 faces the abutting surface 315 on the rear side. The impact block 320 is provided with two annular structures at the mounting groove 324. The two annular structures may be defined as a socket ring 325 and a protective ring 326. The inner sidewall of the socket ring 325 is used for being in contact with the main shaft 310, the outer sidewall of the socket ring 325 is the inner sidewall of the mounting groove 324, and the inner sidewall of the protective ring 326 is the outer sidewall of the mounting groove 324. From the groove bottom of the mounting groove 324, the length of the socket ring 325 is greater than the length of the protective ring 326. In this manner, on the premise that the contact area between the impact block 320 and the main shaft 310 is ensured, the outer diameter of the end of the impact block 320 facing the abutting surface 315 can be reduced, thereby providing more possibilities for the layout of the impact wrench 10.

The output shaft 400 is provided with a connection groove 420 that connects with the connecting groove 440. The outer circumference of the output shaft 400 is provided with a second annular groove 430. A rotary protective sleeve 450 is sleeved on the output shaft 400. A third annular groove 451 is disposed on the inner sidewall of the rotary protective sleeve 450. The third annular groove 451 and the second annular groove 430 are opposite and form an oil-containing annular cavity.

In the related art, for the impact wrench 10, the output shaft 400 is conventionally designed with a vent, an end of the vent connects with the connection groove 420, and the other end of the vent connects with the second annular groove 430. However, for a wrench with large torque, the vent is the weak point, possibly causing the output shaft 400 to break. If the vent is removed, after lubricating oil is added to the output shaft 400, a certain vapor lock may be generated during the assembly of the main shaft 310 and the output shaft 400, resulting in difficult assembly. To solve this problem, in the present application, an axially penetrating first accommodation cavity 313 is disposed on the main shaft 310, and a rubber column 3131 is mounted in the first accommodation cavity 313. During the assembly of the main shaft 310 and the output shaft 400, the rubber column 3131 can provide a certain axial movement stroke for air flow and avoid or reduce the vapor lock during assembly. After assembly, the rubber column 3131 prevents the grease at the rear end of the output shaft 400 and in the gearbox from flowing through the first accommodation cavity 313 and the vent passage. In this manner, the vent is removed, thereby avoiding the problem of weakness of the output shaft 400 caused by the vent.

As shown in FIG. 3, a second accommodation cavity 314 is disposed on the rear part of the main shaft 310 and used for avoiding a drive gear 211 disposed at the front end of the drive shaft 210, so as to reduce the overall length.

In this example, the tightening torque of the output shaft to a workpiece is greater than or equal to 700 foot-pounds. It is to be explained that the "tightening torque" is the torque applied to a fastener in the direction of tightening the workpiece. That is, the impact block 320 can output the continuous rotational impact to the workpiece through the output shaft 400 with the torque T greater than or equal to 700 foot-pounds. The length L1 from the rear end of the housing 100, that is, the rear end of the tail housing 113 to the front end of the holding portion 410 is less than or equal to 210 mm. In some examples, the length L1 from the rear end of the housing 100 to the front end of the holding portion 410 is less than or equal to 205 mm. In some examples, the length L1 from the rear end of the housing 100 to the front end of the holding portion 410 is less than or equal to 200 mm.

In some examples, the tightening torque of the output shaft to the workpiece is greater than or equal to 750 foot-pounds, and the length L1 from the rear end of the housing 100, that is, the rear end of the tail housing 113 to the front end of the holding portion 410 is less than or equal to 210 mm. In some examples, the length L1 from the rear end of the housing 100 to the front end of the holding portion 410 is less than or equal to 205 mm. In some examples, the length L1 from the rear end of the housing 100 to the front end of the holding portion 410 is less than or equal to 200 mm.

In some examples, the tightening torque of the output shaft to the workpiece is greater than or equal to 800 foot-pounds, and the length L1 from the rear end of the housing 100, that is, the rear end of the tail housing 113 to the front end of the holding portion 410 is less than or equal to 210 mm. In some examples, the length L1 from the rear end of the housing 100 to the front end of the holding portion 410 is less than or equal to 205 mm. In some examples, the length L1 from the rear end of the housing 100 to the front end of the holding portion 410 is less than or equal to 200 mm.

In some examples, the tightening torque of the output shaft to the workpiece is greater than or equal to 850 foot-pounds, and the length L1 from the rear end of the housing 100, that is, the rear end of the tail housing 113 to the front end of the holding portion 410 is less than or equal to 210 mm. In some examples, the length L1 from the rear end of the housing 100 to the front end of the holding portion 410 is less than or equal to 205 mm. In some examples, the length L1 from the rear end of the housing 100 to the front end of the holding portion 410 is less than or equal to 200 mm.

In some examples, the tightening torque of the output shaft to the workpiece is greater than or equal to 900 foot-pounds, and the length L1 from the rear end of the housing 100, that is, the rear end of the tail housing 113 to the front end of the holding portion 410 is less than or equal to 210 mm. In some examples, the length L1 from the rear end of the housing 100 to the front end of the holding portion 410 is less than or equal to 205 mm. In some examples, the length L1 from the rear end of the housing 100 to the front end of the holding portion 410 is less than or equal to 200 mm.

In some examples, when the body housing 110 or the housing 100 is a spliced structure of the first housing and the second housing and the rear end surfaces of the first housing and the second housing define the rear end of the body housing 110 or the housing 100, the tightening torque of the output shaft to the workpiece is greater than or equal to 700 foot-pounds, and the length L1 from the rear end of the housing 100 to the front end of the output shaft 400 is less than or equal to 210 mm. In some examples, the length L1 from the rear end of the housing 100 to the front end of the output shaft 400 is less than or equal to 205 mm. In some examples, the length L1 from the rear end of the housing 100 to the front end of the output shaft 400 is less than or equal to 200 mm.

In some examples, when the body housing 110 or the housing 100 is a spliced structure of the first housing and the second housing and the rear end surfaces of the first housing and the second housing define the rear end of the housing 100, the tightening torque of the output shaft to the workpiece is greater than or equal to 750 foot-pounds, and the length L1 from the rear end of the housing 100 to the front end of the output shaft 400 is less than or equal to 210 mm. In some examples, the length L1 from the rear end of the housing 100 to the front end of the output shaft 400 is less than or equal to 205 mm. In some examples, the length L1 from the rear end of the housing 100 to the front end of the output shaft 400 is less than or equal to 200 mm.

In some examples, when the body housing 110 or the housing 100 is a spliced structure of the first housing and the second housing and the rear end surfaces of the first housing and the second housing define the rear end of the housing 100, the tightening torque of the output shaft to the workpiece is greater than or equal to 800 foot-pounds, and the length L1 from the rear end of the housing 100 to the front end of the output shaft 400 is less than or equal to 210 mm. In some examples, the length L1 from the rear end of the housing 100 to the front end of the output shaft 400 is less than or equal to 205 mm. In some examples, the length L1 from the rear end of the housing 100 to the front end of the output shaft 400 is less than or equal to 200 mm.

In some examples, when the body housing 110 or the housing 100 is a spliced structure of the first housing and the second housing and the rear end surfaces of the first housing and the second housing define the rear end of the housing 100, the tightening torque of the output shaft to the workpiece is greater than or equal to 850 foot-pounds, and the length L1 from the rear end of the housing 100 to the front end of the output shaft 400 is less than or equal to 210 mm. In some examples, the length L1 from the rear end of the housing 100 to the front end of the output shaft 400 is less than or equal to 205 mm. In some examples, the length L1 from the rear end of the housing 100 to the front end of the output shaft 400 is less than or equal to 200 mm.

In some examples, when the body housing 110 or the housing 100 is a spliced structure of the first housing and the second housing and the rear end surfaces of the first housing and the second housing define the rear end of the housing 100, the tightening torque of the output shaft to the workpiece is greater than or equal to 900 foot-pounds, and the length L1 from the rear end of the housing 100 to the front end of the output shaft 400 is less than or equal to 210 mm. In some examples, the length L1 from the rear end of the housing 100 to the front end of the output shaft 400 is less than or equal to 205 mm. In some examples, the length L1 from the rear end of the housing 100 to the front end of the output shaft 400 is less than or equal to 200 mm.

In this example, the ratio of the tightening torque to the bare weight of the impact tool is greater than or equal to 152 foot-pounds per pound. For example, when the bare weight of the impact tool is 10 pounds, the tightening torque is greater than or equal to 1520 foot-pounds. In some examples, the ratio of the tightening torque to the bare weight of the impact tool is greater than or equal to 155 foot-pounds per pound. In some examples, the ratio of the tightening torque to the bare weight of the impact tool is greater than or equal to 160 foot-pounds per pound. In some examples, the ratio of the tightening torque to the bare weight of the impact tool is greater than or equal to 170 foot-pounds per pound.

As shown in FIGS. 1 and 2 and FIGS. 14 to 17, in this example, the impact wrench 10 further includes the hanging assembly 500. In some examples, the rotary power tool includes the hanging assembly 500. In this example, the hanging assembly 500 is used for hanging the impact wrench 10 in a first state. The hanging assembly 500 includes an opening for a suspended part 900 to enter so that the hanging assembly 500 is suspended on the suspended part 900. In this example, the opening faces the power supply coupling portion 124. When the impact wrench 10 is in the first state, the included angle γ between the extension direction of the drive axis 101 and the horizontal direction is less than or equal to 45°. In this example, the extension direction of a suspension axis 901 is basically horizontal, and the included angle γ may be understood as the included angle between the extension direction of the drive axis 101 and the extension direction of the suspension axis 901. In some examples, the extension direction of the drive axis 101 is basically parallel to the horizontal direction. In some examples, the extension direction of the drive axis 101 is basically parallel to the suspension axis 901. The output shaft 400 is located on the upper side of the power supply coupling portion 124. That is, when the impact wrench 10 is in the first state, the output shaft 400 is at a basically upper position. It is to be explained that in the product, due to tolerances, manufacturing errors, or measurement-related errors, the extension direction of the drive axis 101 is not completely parallel to the horizontal direction or the extension direction of the suspension axis 901. Therefore, being parallel or basically parallel here should be considered as disclosing a range defined by absolute values of two endpoints. A parallel or basically parallel arrangement may mean that the included angle between the extension direction of the drive axis 101 and the horizontal direction or the extension direction of the suspension axis 901 is 0° plus or minus a certain percentage (for example, 1%, 5%, 10%, or more).

In the related art, a U-shaped hook with an upward opening is used to hang the impact wrench 10, causing the impact wrench 10 to hang upside down, that is, the output shaft 400 faces downward. When a user needs to use the impact wrench 10 again, the user needs to flip the impact wrench 10, that is, the user needs to move the impact wrench 10 upward to remove the impact wrench 10 from a hanging rod 910 of the suspended part 900 and then rotate the tool by 180° to make the output shaft 400 face upward. Such operations affect the working efficiency. Moreover, a heavier impact tool places greater operational demands on the user, and there is a risk of the tool falling during the flipping process.

In this example, in the case where the impact wrench 10 is hung in the first state, when the user hangs the impact wrench 10 or fetches and uses the impact wrench 10 again, the user does not need to flip the rotary power tool, and the user only needs to move the rotary power tool downward to place the rotary power tool on the hanging rod 910 or move the rotary power tool upward to remove the rotary power tool from the hanging rod 910 so that the impact wrench 10 is always kept or basically kept at the working position, thereby improving the working efficiency. In this manner, the impact wrench 10 is prevented from being flipped when the impact wrench 10 is used again so that the output shaft 400 changes from downward to horizontal, thereby reducing wrist movement, which is conducive to wrist health. It is to be explained that the "hanging" in the first state of the impact wrench 10 is different from the safety rope hanging during working at a high altitude. The "hanging" state here means that when a set of operations is completed and the user needs to rest or use another tool, the user needs to stably hang the impact wrench 10 on the suspended part 900. Generally, the suspended part 900 is not provided with an opening for the hanging assembly 500 to enter, and the hanging assembly 500 needs to be provided with an opening for the suspended part 900 to enter. After being hung, the hanging assembly 500 can bear the weight of the impact wrench 10 and stabilize the center of gravity, thereby ensuring that the impact wrench 10 does not shake or fall. The suspension axis 901 generally refers to the axial axis of the suspended part 900 at the position of the hanging assembly 500, that is, the direction in which the suspended part 900 extends beyond two ends of the hanging assembly 500. The axial axis of the suspended part 900 is basically perpendicular to the opening of the hanging assembly 500. In this example, the suspended part 900 is a rod-like object. In this example, the suspended part 900 is a strip-like object.

It is to be understood that when the rotary power tool is an electric screwdriver or an electric drill and does not need to provide an impact force, the impact assembly 300 does not need to be provided between the transmission assembly 270 and the output shaft 400, which does not affect the relevant structural content of the hanging assembly 500.

In this example, the hanging assembly 500 includes a mounting seat 510 and a hook 520, where the mounting seat 510 is mounted on the housing 100, and the hook 520 is detachably connected to the mounting seat 510. In this manner, the hook 520 is more convenient to maintain and replace. The hook 520 is provided with an opening facing downward.

To ensure that the impact wrench 10 in the first state can maintain balance, in this example, the body housing 110 of the housing 100 includes the tail housing 113, the barrel 111, and the head housing 112 connected in sequence, and the installation position of the mounting seat 510 includes the barrel 111, the joint between the barrel 111 and the head housing 112, the head housing 112, the joint between the barrel 111 and the tail housing 113, or the tail housing 113. The specific position may be set according to the internal structure and the position of the center of gravity of the whole impact wrench 10, as long as the impact wrench 10 hung in the first state can maintain balance.

In actual applications, the user may be accustomed to using the left hand to hold the impact wrench 10 or may be accustomed to using the right hand to hold the impact wrench 10, or due to other factors such as injury, the user may only be able to use the impact wrench 10 with the left hand or the right hand. To adapt to the preceding situations, in this example, two mounting seats 510 are separately provided on two sides of the barrel 111, two sides of the joint between the barrel 111 and the head housing 112, two sides of the head housing 112, two sides of the joint between the barrel 111 and the tail housing 113, or two sides of the tail housing 113. The two sides in this example refer to the left and right sides. That is, one mounting seat 510 is disposed on the left side of the barrel 111, and one mounting seat 510 is disposed on the right side of the barrel 111. Alternatively, one mounting seat 510 is disposed on the left side of the joint between the barrel 111 and the head housing 112, and one mounting seat 510 is disposed on the right side of the joint between the barrel 111 and the head housing 112. Alternatively, one mounting seat 510 is disposed on the left side of the head housing 112, and one mounting seat 510 is disposed on the right side of the head housing 112. Alternatively, one mounting seat 510 is disposed on the left side of the tail housing 113, and one mounting seat 510 is disposed on the right side of the tail housing 113. Alternatively, one mounting seat 510 is disposed on the left side of the joint between the barrel 111 and the tail housing 113, and one mounting seat 510 is disposed on the right side of the joint between the barrel 111 and the tail housing 113.

The hook 520 of the traditional impact wrench 10 is disposed at the power supply coupling portion 124, is larger in dimension, and occupies a larger space. Therefore, a freely stowable hook 520 needs to be designed so that not only can the impact wrench 10 be hung on the hook 520, but also the hook 520 is stowable and occupies a smaller space when the hook 520 is not in use.

In this example, the mounting seat 510 is disposed on the body housing 110 of the housing 100 without affecting the use of the power supply coupling portion 124. Therefore, in the bare state, the impact wrench 10 can stand.

Figure 15:
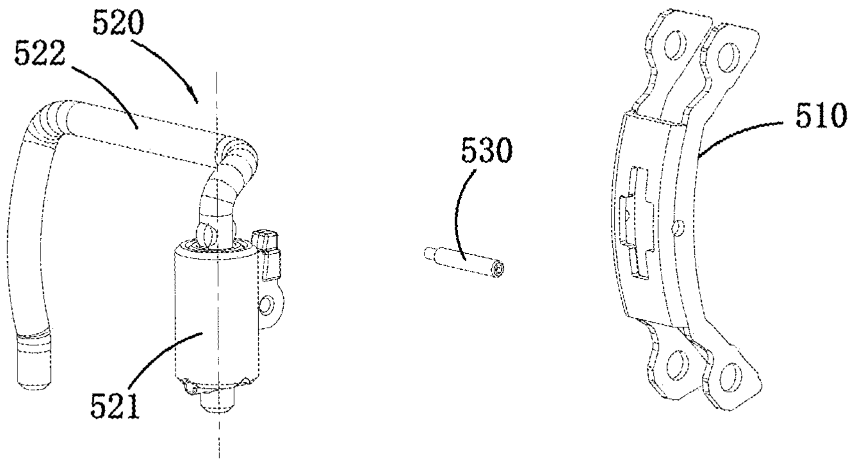
FIG. 15 is an exploded view of a hanging assembly according to an example of the present application.
Figure 16:
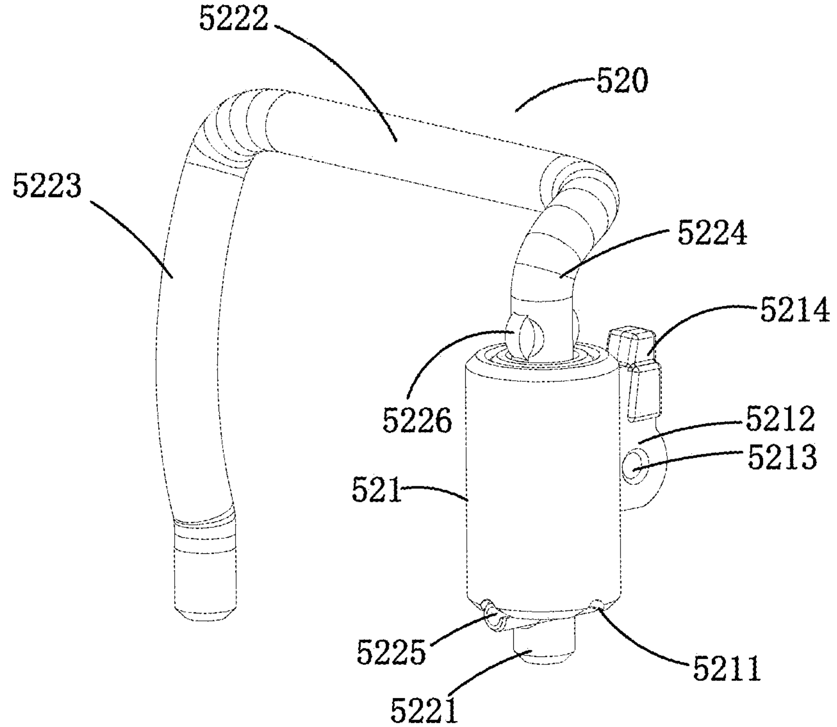
FIG. 16 is a structural view of a hook according to an example of the present application.
Figure 17:
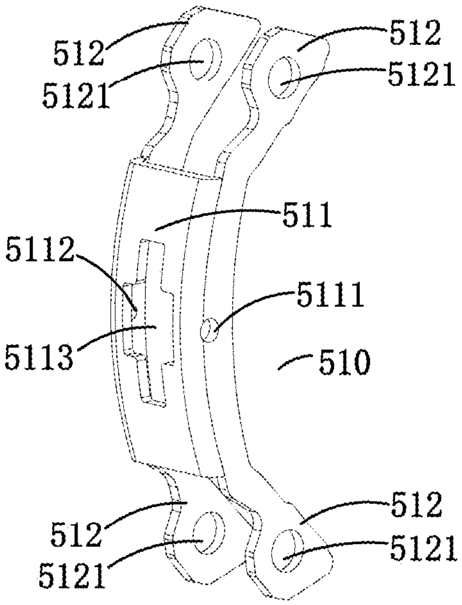
FIG. 17 is a structural view of a mounting seat according to an example of the present application.

As shown in FIGS. 15 to 17, the mounting seat 510 includes a first assembly portion 511, the hook 520 includes a second assembly portion 521 and a hook body 522, the second assembly portion 521 is detachably connected to the first assembly portion 511, and the hook body 522 includes a storage state and a hanging state. The hook body 522 in the storage state may be close to the housing 100 or directly fit the housing 100. The hook body 522 in the hanging state can be hooked on an object such as the hanging rod 910 of the suspended part 900. That is to say, when the hook body 522 is in the storage state, a plane where the hook body 522 is located is parallel to the drive axis 101. When the hook body 522 is in the hanging state, the plane where the hook body 522 is located is perpendicular to the drive axis 101. That is, the hook body 522 needs to be rotated by approximately 90° between the storage state and the hanging state. In this example, the hook body 522 may have a flat plate structure, and the hook body 522 includes a flat plate part with an opening. In some examples, the hook body 522 is formed by bending a rod-like part into an opening in the same plane.

Regarding the structure of the hook 520, in some examples, the second assembly portion 521 is provided with a rotation hole, and the hook body 522 includes a first connecting rod 5221, a second connecting rod 5222, and a third connecting rod 5223, where an end of the first connecting rod 5221 is connected to an end of the second connecting rod 5222, the other end of the second connecting rod 5222 is connected to an end of the third connecting rod 5223, the hook body 522 is in an inverted U shape as a whole, and the first connecting rod 5221 is rotatably connected to the rotation hole. When the hook body 522 is in the storage state, the second connecting rod 5222 is parallel to the drive axis 101. When the hook body 522 is in the hanging state, the second connecting rod 5222 is perpendicular to the drive axis 101. The first connecting rod 5221 is provided with a first stop portion 5225 and a second stop portion 5226, where the first stop portion 5225 is located at an end of the rotation hole, and the second stop portion 5226 is located at the other end of the rotation hole. In this example, the first stop portion 5225 is located at the lower end of the rotation hole, and the second stop portion 5226 is located at the upper end of the rotation hole. In this manner, the first connecting rod 5221 is prevented from being pulled away from the rotation hole. A bending rod 5224 is disposed between the first connecting rod 5221 and the second connecting rod 5222. When the hook body 522 is in the storage state, the bending rod 5224 is bent toward the housing so that the second connecting rod 5222 fits the housing 100. The third connecting rod 5223 includes an arc-shaped rod and a vertical rod that are connected, and the other end of the second connecting rod 5222 is connected to the arc-shaped rod. When the hook body 522 is in the storage state, the arc-shaped rod fits the housing 100, the curvature of the arc-shaped rod matches the diameter of the housing 100, the vertical rod faces vertically downward, and the extension direction of the vertical rod is parallel to the extension direction of the first connecting rod 5221. In this example, the first connecting rod 5221 extends in the up and down direction. The arrangement of the arc-shaped rod is conducive to saving the space occupied by the hook body 522 in the storage state, and the arrangement of the vertical rod is conducive to improving the hooking efficiency. When the hook body 522 is in the storage state, the arc-shaped rod is located at the rear side of the first connecting rod 5221.

To keep the hook body 522 in the storage state and the hanging state, in this example, a position fixing structure is disposed between the second assembly portion 521 and the hook body 522.

Regarding the specific implementation of the position fixing structure, in an example, the first stop portion 5225 includes a stop pin, the diameter of the stop pin can be reduced, the axis of the rotation hole extends in the up and down direction, the second assembly portion 521 is provided with at least two intersecting limiting grooves 5211 at an end where the rotation hole is in contact with the stop pin, the first connecting rod 5221 is provided with a connecting rod hole, the axis extension direction of the connecting rod hole is perpendicular to the up and down direction, and the stop pin is disposed in the connecting rod hole; when the hook body 522 is in the storage state, the stop pin is located in one of the limiting grooves 5211, and when the hook body 522 is in the hanging state, the stop pin is located in the other limiting groove 5211. Regarding the diameter reducing structure of the stop pin, in this example, specifically, the stop pin is formed by rolling an elastic sheet and is in the shape of a column as a whole. The cross section of the stop pin is C-shaped. The stop pin with a C-shaped cross section facilitates diameter reduction. During operation, the first connecting rod 5221 rotates relative to the second assembly portion 521. During rotation, the stop pin is pressed against the sidewall of the limiting groove 5211 so that the diameter of the stop pin becomes smaller, the distance between the stop pin and the second stop portion 5226 is increased, and the stop pin can cross the current limiting groove 5211 and enter the other limiting groove 5211. In this example, the included angle between the extension directions of the two limiting grooves 5211 is 90°. In other examples, multiple limiting grooves 5211 may be provided so that the hook body 522 can be fixed at multiple angles when rotating relative to the second assembly portion 521. In other examples, the stop pin may be formed by wrapping an elastic rubber cylinder around a cylindrical pin. The elastic rubber cylinder can deform when being pressed so that the diameter of the whole stop pin becomes smaller.

Regarding the specific implementation of the position fixing structure, in another example, the first stop portion 5225 includes the stop pin, and the distance between the stop pin and the second stop portion 5226 can be changed. Specifically, the rotation hole extends in the up and down direction, the second assembly portion 521 is provided with at least two intersecting limiting grooves 5211 at an end where the rotation hole is in contact with the stop pin, the first connecting rod 5221 is provided with the connecting rod hole, the axis extension direction of the connecting rod hole is perpendicular to the up and down direction, the connecting rod hole is a long hole, the length direction of the connecting rod hole is the up and down direction, the stop pin is disposed in the connecting rod hole and is slidable along the up and down direction, and an elastic member is disposed between the second assembly portion 521 and the stop pin to make the stop pin approach the second stop portion 5226; when the hook body 522 is in the storage state, the stop pin is located in one of the limiting grooves 5211, and when the hook body 522 is in the hanging state, the stop pin is located in the other limiting groove 5211. During operation, the first connecting rod 5221 rotates relative to the second assembly portion 521. During rotation, the stop pin and the limiting groove 5211 are pressed against each other and relatively displaced so that the distance between the stop pin and the second stop portion 5226 is increased, and the stop pin can cross the current limiting groove 5211. At this time, the elastic member deforms and stores energy. When the stop pin enters the other limiting groove 5211, under the action of the elastic member, the stop pin abuts against the groove bottom of the other limiting groove 5211.

The opening of the limiting groove 5211 faces away from the second stop portion 5226. The second stop portion 5226 is a limiting protrusion disposed on the first connecting rod 5221. The limiting protrusion is formed by squeezing the outer circumferential wall of the first connecting rod 5221.

In this example, the grip 123 is located on the lower side of the body housing 110, and the hook 520 is higher than the grip 123. In other words, the hook 520 does not extend to the grip 123, so as to avoid affecting the user's grip. The handle housing 120 is disposed on the lower side of the housing 100, and the grip 123 is located in the middle of the handle housing 120. The extension direction of the grip 123 intersects with the extension direction of the drive axis 101, and the coupling portion is disposed at an end of the grip 123.

To expand the adaptability of the first assembly portion 511, in this example, a device accessory of the second assembly portion 521 is selectively mounted on the mounting seat 510 through the first assembly portion 511. The device accessory includes a belt clip, a cord, or a bit clip. The belt clip may be worn on the belt of the user so that the impact wrench 10 can be hung on the belt of the user. The other end of the cord may be tied to the user or other devices, so as to prevent the impact wrench 10 from falling. The bit clip can accommodate multiple different types of bits, making it easy for the user to replace bits. Both the device accessory and the hook 520 may be referred to as the body portion.

In this example, the mounting seat 510 includes connecting portions 512, where the connecting portions 512 and the first assembly portion 511 are connected and integrally formed, and the connecting portions 512 are connected to the housing 100 through fasteners. Specifically, the connecting portion 512 is provided with a connecting hole 5121, and the fastener is threadedly connected to the housing 100 after passing through connecting holes 5121. In this example, the fastener includes a locking bolt 130.

In this example, as shown in FIG. 6 and FIGS. 15 to 17, the fasteners simultaneously connect the barrel 111 and the head housing 112 to the mounting seat 510. First connecting protrusions 1111 are convexly provided on the outer circumference of the barrel 111, and the first connecting protrusion 1111 is provided with a first screw hole. Head connecting protrusions 1121 are convexly disposed on the outer circumference of the head housing 112, and the head connecting protrusion 1121 is provided with a head mounting hole.

In the example where the fasteners simultaneously connect the barrel 111 and the head housing 112 to the mounting seat 510, multiple examples exist. In the first connection manner, the locking bolt 130 passes through the connecting hole 5121 and the head mounting hole and then is threaded into the first screw hole. In the second connection manner, the connecting portion 512 is located between the first connecting protrusion 1111 and the head connecting protrusion 1211, and the locking bolt 130 passes through the head mounting hole and the connecting hole 5121 in sequence and then is threaded into the first screw hole. In the third connection method, two connecting portions 512 are provided, one of the connecting portions 512 is located between the first connecting protrusion 1111 and the head connecting protrusion 1211, the other connecting portion 512 is located at an end of the head connecting protrusion 1211 facing away from the first connecting protrusion 1111, and the locking bolt 130 passes through the connecting hole 5121 of one of the connecting portions 512, the head mounting hole, and the connecting hole 5121 of the other connecting portion 512 in sequence and then is threaded into the first screw hole.

In this example, the connecting portions 512 are disposed at two ends of the first assembly portion 511, the first assembly portion 511 is used for connecting the second assembly portion 521, and the connecting portions 512 are threadedly connected to the housing 100 through the fasteners. Specifically, two connecting portions 512 are disposed at an end of the first assembly portion 511, two connecting portions 512 are disposed at the other end of the first assembly 511, at least three first connecting protrusions 1111 are convexly provided on the outer circumference of the barrel 111, the first connecting protrusion 1111 is provided with the first screw hole, at least three head connecting protrusions 1211 are convexly provided on the outer circumference of the head housing 112, the head connecting protrusion 1211 is provided with the head mounting hole, the head connecting protrusions 1211 are disposed in one-to-one correspondence with the first connecting protrusions 1111, the first assembly portion 511 is located between two adjacent first connecting protrusions 1111, that is, between two adjacent head connecting protrusions 1211, and for the connection relationship between the connecting portions 512 and the housing 100, reference may be made to the content in the third connection manner.

In this example, the first assembly portion 511 is hinged with a connecting seat 5212 of the second assembly portion 521. Specifically, the connecting seat 5212 is provided with a first hole 5213, the first assembly portion 511 is provided with a bypass groove, one of two sidewalls of the bypass groove is provided with a second hole 5111, the other one of the two sidewalls of the bypass groove is provided with a third hole 5112, the connecting seat 5212 is located in the bypass groove, and a connecting pin 530 passes through the second hole 5111, the first hole 5213, and the third hole 5112. Further, the third hole 5112 is a threaded hole, an end of the connecting pin 530 is provided with a stud, and the stud is threaded into the threaded hole. Furthermore, the outer diameter of the stud is less than the outer diameter of the connecting pin 530. The other end of the connecting pin 530 is provided with a hexagon socket for matching a socket head cap screw. A limiting column 5214 is provided at an end of the connecting seat 5212 and partially fits the first assembly portion 511, so as to prevent the connecting seat 5212 from rotating about the axis of the connecting pin 530. In this example, the limiting column 5214 is located on a side of the first hole 5213, the groove bottom of the bypass groove is provided with a through hole 5113, and the limiting column 5214 can pass through the through hole 5113 and be sandwiched in the gap between the first assembly portion 511 and the housing 100. The limiting column 5214 is located on the upper side of the first hole 5213.

The mounting seat 510 is formed by cutting and bending a sheet steel plate. The sheet steel plate is cut into an H shape, the through hole 5113 is disposed at the middle joint, two long sides are bent by 90°, the second hole 5111 is located on a long side, and the third hole 5112 is located on the other long side. The two long sides are separately the two sidewalls of the bypass groove. The connecting portion 512 is located at the end of the long side.

As shown in FIGS. 1 to 6, the impact wrench 10 further includes a main switch 260. The main switch 260 is used for controlling the operation of the electric motor 200, including the starting, stopping, and rotational speed of the electric motor 200.

A first mounting portion 541 is used for connecting a lanyard. The first mounting portion 541 is disposed at a position where the body housing 110 and the grip 123 are coupled, and the first mounting portion 541 is close to the rear end of the body housing 110. The lanyard is connected to the first mounting portion 541 at this position so that when the rotary power tool is used, the lanyard is connected upward to a safety lever, and the lanyard is located above the grip 123 and behind the main switch 260 and does not block the main switch 260, thereby improving the user experience. In the example with the handle housing 120, the first mounting portion 541 is disposed at a position where the body housing 110 and the handle housing 120 are coupled.

To improve the convenience of holding the impact wrench 10 again when the impact wrench 10 is connected to the safety rope, in this example, the first mounting portion 541 is closer to the drive shaft 210 than the main switch 260. That is to say, when the impact wrench 10 is standing, the first mounting portion 541 is located on the upper side of the main switch 260. The specific position of the first mounting portion 541 may be reasonably adjusted according to the mass distribution of the whole impact wrench 10. When an operator holds the impact wrench 10, the first mounting portion 541 is close to the purlicue, and then when the thumb and other fingers hold the grip 123, the forefinger can just touch the main switch 260. The lanyard is located above the hand of the operator, thereby improving the efficiency of accurate holding and greatly improving the user experience.

For example, the lanyard is connected to the safety lever of the user at the work site so that if the user drops the impact wrench 10, the lanyard, a first mount 540, and the housing 100 cooperate to prevent the impact wrench 10 from hitting the ground.

In this example, the grip 123 is at least partially located below the barrel 111. The head housing 112 is disposed at the front end of the whole body housing 110, and the rear end portion of the head housing 112 extends into the front end portion of the barrel 111. The preceding arrangement can effectively improve the connection strength between the head housing 112 and the barrel 111 and is conducive to improving the sealing performance.

In an example in which the hanging assembly 500 is not provided, the barrel 111 and the head housing 112 are connected through threaded fasteners. Through the threaded fasteners, the barrel 111 and the head housing 112 are firmly connected and are easy to install. In this example, the first connecting protrusions 1111 are provided along the circumferential direction of the barrel 111, the first connecting protrusion 1111 is provided with the first screw hole, the head connecting protrusions 1121 are provided on the head housing 112, the head connecting protrusion 1121 is provided with the head mounting hole, the threaded fastener includes the locking bolt 130, and the locking bolt 130 passes through the head mounting hole and then threadedly mates with the first screw hole. Four first screw holes and four head mounting holes are provided separately. In other examples, three first screw holes and three head mounting holes are provided separately, or five first screw holes and five head mounting holes are provided separately. In this example, the first connecting protrusions and the head connecting protrusions 1121 can function as stiffeners to improve the strength of the body housing 110.

To improve the sealing performance of the body housing 110, in this example, a sealing member is disposed between the barrel 111 and the head housing 112. Specifically, the head housing 112 is provided with an annular groove, the sealing member includes a sealing ring, and the sealing ring is disposed in the annular groove. The sealing ring is sandwiched between the head housing 112 and the barrel 111.

In this example, further, anti-loosening glue is applied between the barrel 111 and the head housing 112. The anti-loosening glue is provided so that the connection between the barrel 111 and the head housing 112 is stronger and the sealing performance is better.

In this example, the tail housing 113 is located at the rear end of the body housing 110 and is connected to the barrel 111 through threaded fasteners. Specifically, second connecting protrusions 1112 are provided along the circumferential direction of the barrel 111, the second connecting protrusion 1112 is provided with a second screw hole, tail connecting protrusions 1131 are provided on the tail housing 113, the tail connecting protrusion 1131 is provided with a tail mounting hole, the threaded fastener includes the locking bolt 130, and the locking bolt 130 passes through the tail mounting hole and then threadedly mates with the second screw hole. Four second screw holes and four tail mounting holes are provided separately. In other examples, three second screw holes and three tail mounting holes are provided separately, or five second screw holes and five tail mounting holes are provided separately.

In the first example, the electric motor 200 is partially located in the barrel 111. In the second example, the output shaft 400 is partially disposed in the head housing 112. In the third example, the electric motor 200 is partially located in the barrel 111, and the output shaft 400 is partially disposed in the head housing 112. The transmission assembly 270 is located in the barrel 111.

In this example, the impact wrench 10 includes the first mount 540, the first mount 540 includes a first fixing portion 542 and a first lanyard hole, the first mounting portion 541 includes the first lanyard hole, the lanyard passes through the first lanyard hole, is knotted, and then is fixedly connected to the first mount 540, and the first mount 540 is connected to the handle housing 120 through the first fixing portion 542. Specifically, the first fixing portion 542 includes a fixing hole, and a screw passes through the fixing hole and is connected to the housing 100 through a threaded fixing member. In this example, the threaded fixing member is a screw hole disposed in the housing 100 or a fixing member with a screw hole disposed in the housing 100.

The extension direction of the first lanyard hole is the left and right direction so that the direction in which the impact wrench 10 is placed is fixed.

Figure 6:
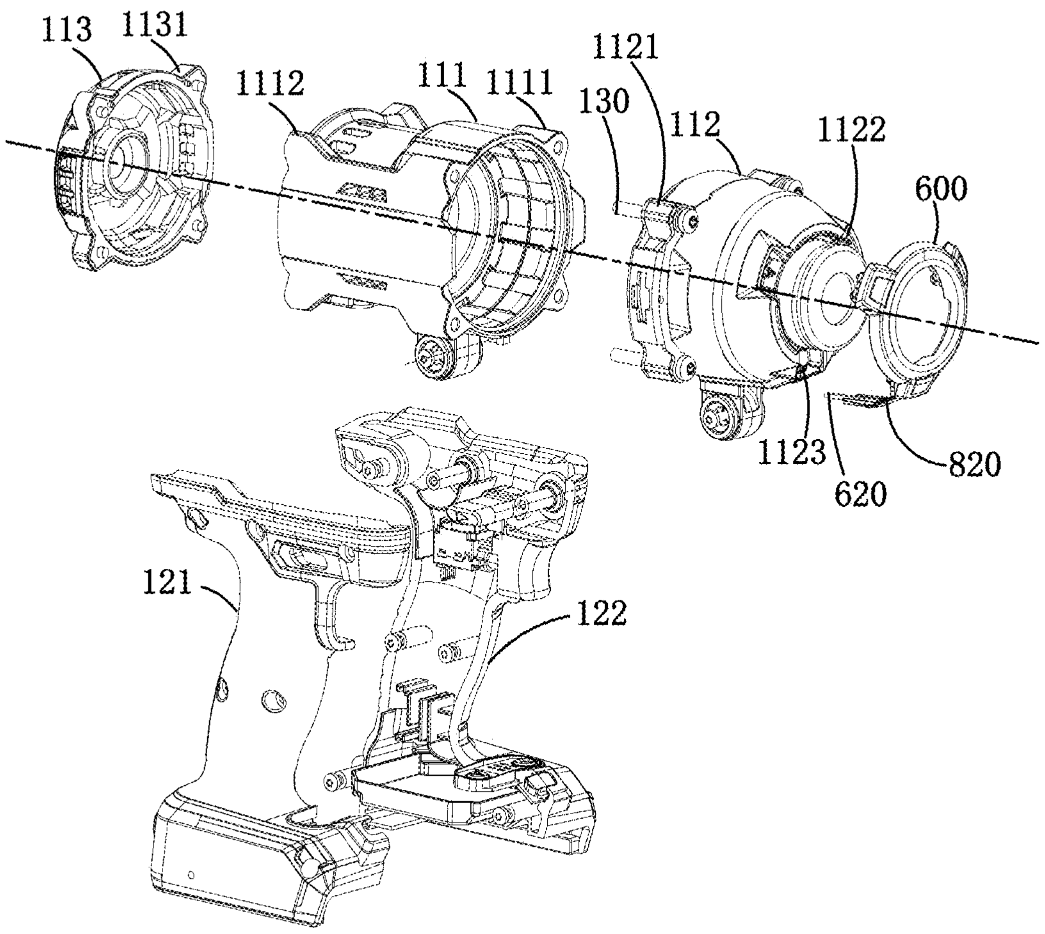
FIG. 6 is an exploded view of a housing according to an example of the present application.
Figure 7:
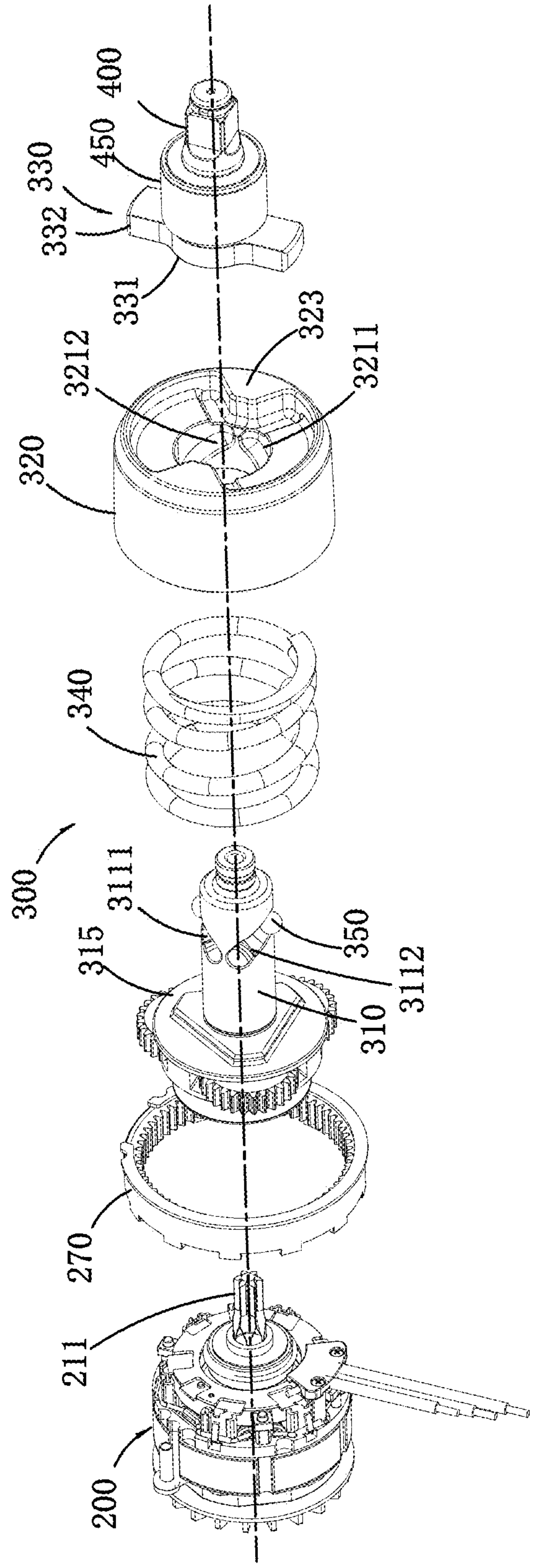
FIG. 7 is an exploded view of an impact assembly according to an example of the present application.

As shown in FIG. 6, the handle housing 120 is located below the barrel 111. In this example, the handle housing

120 includes a left handle housing 121 and a right handle housing 122 that are connected through the threaded fastener. In this example, the first mount 540 is sandwiched between the left handle housing 121 and the right handle housing 122, and the screw passes through the left housing and the first lanyard hole in sequence and then is connected to a threaded hole of the right housing through the threaded fastener.

To prevent the first mount 540 from interfering with the operator during use, the tail housing 113 is disposed at the rear end of the body housing 110, and along the direction of the drive axis 101, the rear end of the first mount 540 does not extend beyond the rear end of the tail housing 113. The first mount 540 partially overlaps the barrel 111 along a direction perpendicular to the drive axis 101.

The impact wrench 10 further includes a second mounting portion 551 located on the rear side of the power supply coupling portion 124, and the user may selectively mount the lanyard on the first mounting portion 541 or the second mounting portion 551.

The impact wrench 10 includes a second mount 550, and the second mount 550 includes the second mounting portion 551. The second mounting portion 551 has a rod-like structure. A gap remains between the second mounting portion 551 and the housing 100. The safety rope passes through this gap and is tied to the second mounting portion 551.

As shown in FIGS. 1 to 6, the impact wrench 10 further includes an illumination element 600 and a protective cover 630, the illumination element 600 is disposed on the head housing 112 and is used for generating light for illumination, the protective cover 630 covers at least the front of the illumination element 600, a portion of the protective cover 630 located in front of the illumination element 600 is made of light-transmissive material, and the protective cover 630 is detachably connected to the head housing 112. The illumination element 600 includes an annular light plate 610, and the annular light board 610 includes a substrate and light beads. The substrate and the light beads are integrally formed. In some examples, the substrate and the light beads may be separate parts. The head housing 112 is provided with a light mounting groove 1122, and the illumination element 600 is located in the light mounting groove 1122. The protective cover 630 is detachably connected to the head housing 112. The protective cover 630 includes a transparent lampshade 640 and a soft rubber lampshade 650. The soft rubber lampshade 650 is provided with an avoidance hole. The transparent lampshade 640 is inserted into the avoidance hole. The soft rubber lampshade 650 may be made of opaque material. The transparent lampshade 640 and the soft rubber lampshade 650 provided separately can block the portion of the illumination element 600 that does not emit light to improve the appearance. A limiting step is disposed at the front end of the avoidance hole, the transparent lampshade 640 is provided with a stop portion, and the stop portion is located at the rear side of the limiting step and abuts against the limiting step. The limiting step can limit the forward displacement of the transparent lampshade 640, thereby improving the stability of the transparent lampshade 640.

Regarding the fixation of the protective cover 630 and the head housing 112, in this example, the stop part is disposed on the head housing 112, and the front end of the soft rubber lampshade 650 abuts against the stop part. In this example, the rear end of the soft rubber lampshade 650 abuts against the opening end of the light mounting groove 1122. The rear end of the transparent lampshade 640 also abuts against the opening end of the light mounting groove 1122. The head housing 112 is provided with an annular snap groove, and an annular snap catch 810 is snap-fit with the annular snap groove, so as to prevent the soft rubber lampshade 650 from moving forward in the axial direction. The annular snap catch 810 is an elastic steel-wire circlip structure.

A wiring duct 1123 is disposed on the lower side of the head housing 112. An end of the wiring duct 1123 connects with the light mounting groove 1122. A wire 620 of the illumination element 600 enters the handle housing 120 through the wiring duct 1123. In this example, the lower side of the head housing 112 is connected to the handle housing 120 through a threaded boss. The threaded boss at least partially extends into the handle housing 120. The wiring duct 1123 passes through the threaded boss. The impact wrench 10 further includes a decorative cover 820 that covers the opening of the wiring duct 1123. The decorative cover 820 is inserted into the opening of the wiring duct 1123. In other examples, the decorative cover 820 and the head housing 112 may be connected through the threaded fastener. In this example, the threaded fastener may be a screw. In the direction of the drive axis 101, the front end surface of the decorative cover 820 abuts against the rear end surface of the soft rubber lampshade 650. The soft rubber lampshade 650 can limit the position of the decorative cover 820, thereby improving the convenience of installation.

Figure 18:
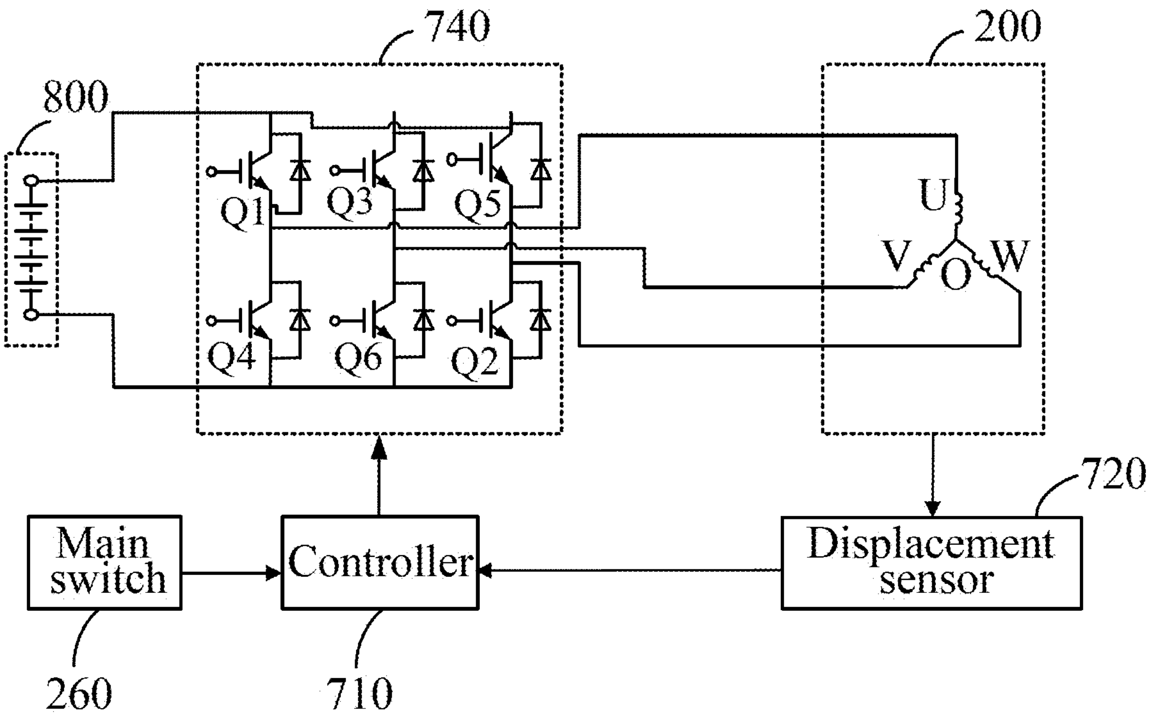
FIG. 18 is a circuit diagram of an impact tool according to another example of the present application.
Figure 19:
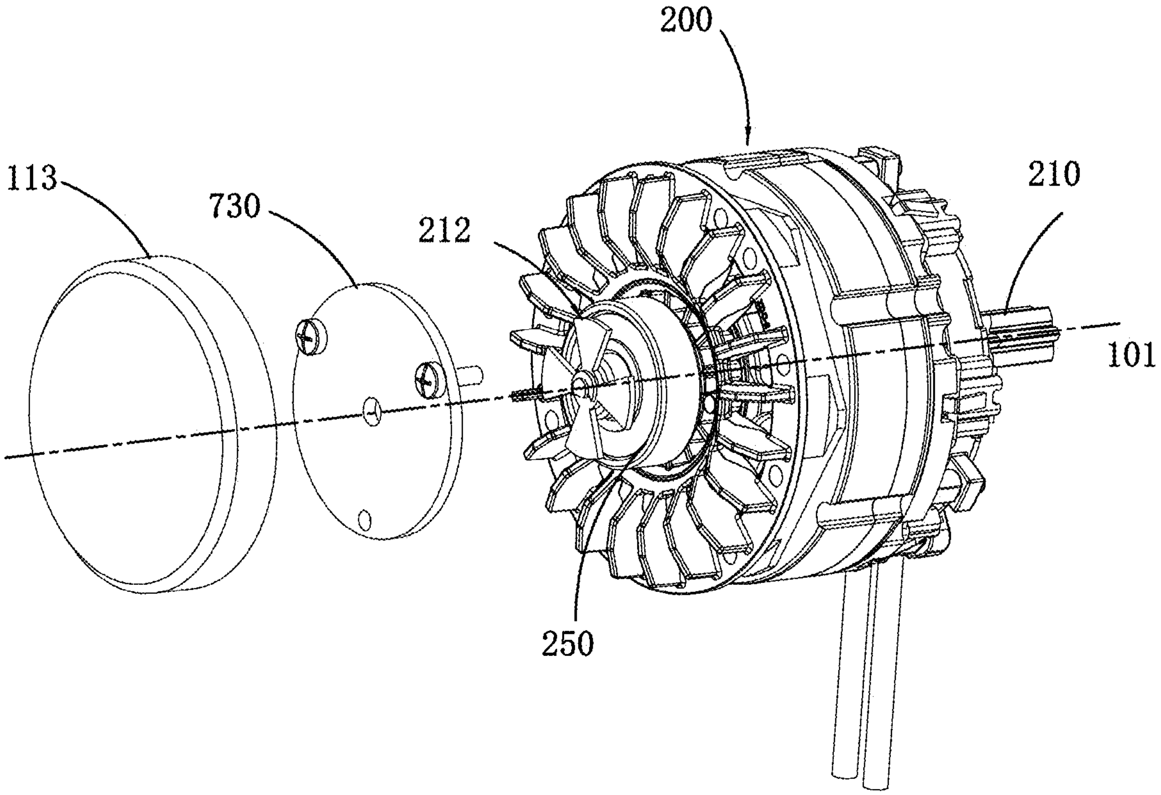
FIG. 19 is an exploded view illustrating part of the structure of an impact tool according to another example of the present application.
Figure 20:
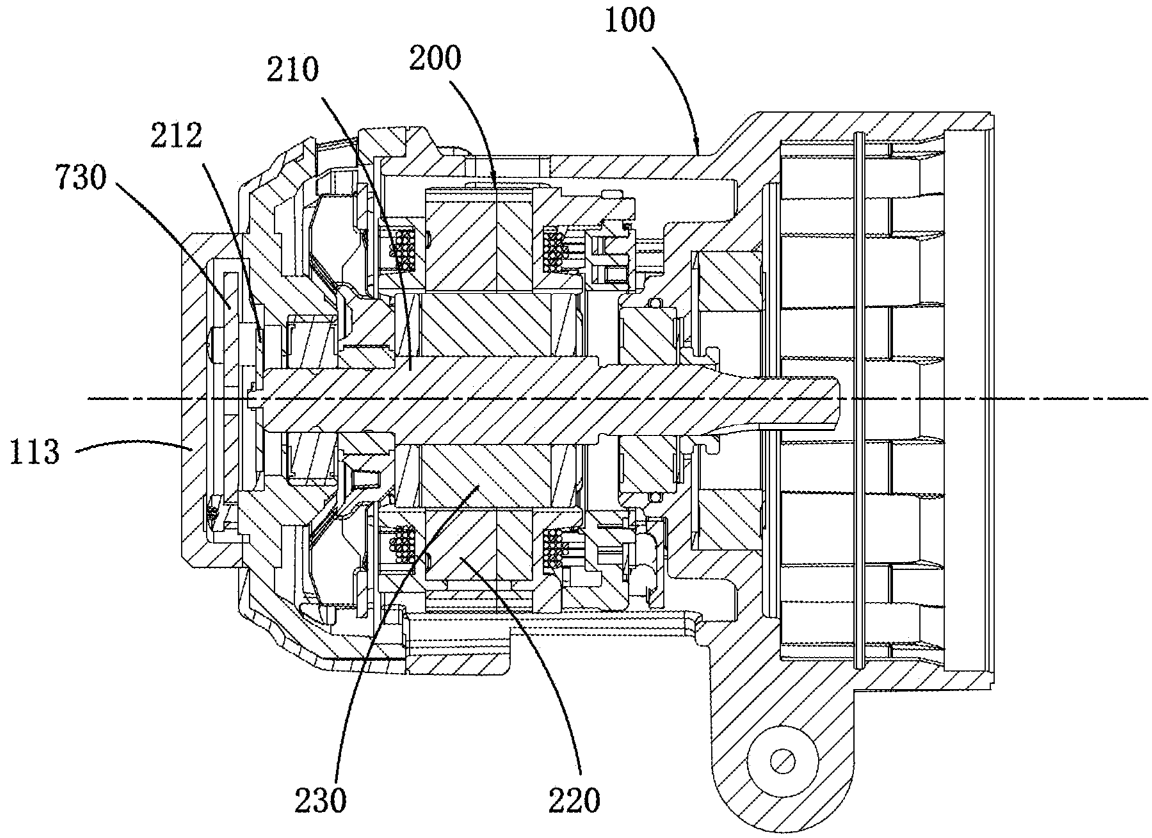
FIG. 20 is a sectional view of an impact tool according to another example of the present application.

FIGS. 18 to 20 show another example of the present application. The impact wrench 10 is provided with a displacement sensor and a target part formed on or connected to the drive shaft. Components with the same functions as those in the first example have the same reference numerals.

In this example, as shown in FIGS. 19 and 20, a target part 212 is formed on or connected to the drive shaft 210, and the target part 212 and the drive shaft 210 move according to a preset rule. As shown in FIG. 18, a displacement sensor 720 detects the motion state information of the target part 212, and the displacement sensor 720 is disposed in the accommodation space of the housing 100 and mounted outside the electric motor 200. The displacement sensor 720 is a non-contact linear sensor. A controller 710 is configured to control the working state of the electric motor 200 according to the motion state information provided by the displacement sensor 720.

In some examples, the electric motor 200 is a three-phase brushless motor including a rotor with a permanent magnet and three-phase stator windings U, V, and W that are commutated electronically. In some examples, the three-phase stator windings U, V, and W adopt a star connection. In other examples, the three-phase stator windings U, V, and W adopt a delta connection. However, it is to be understood that other types of brushless motors are also within the scope of the present disclosure. The brushless motor may include less than or more than three phases of windings.

The drive shaft 210 is formed on or connected to the rotor 230. The drive shaft 210 is connected to the transmission assembly 270 and can transmit the torque outputted by the electric motor 200 to the transmission assembly 270.

The target part 212 is formed on or connected to the drive shaft 210 and may be formed by multiple pieces of fan-blade-shaped metal. The drive shaft 210 rotates about the drive axis 101. During rotation, the target part 212 rotates together with the drive shaft 210 according to the preset rule. For example, the target part 212 may rotate synchronously with the drive shaft 210 or may rotate at N times the rotational speed of the drive shaft 210, where $N>0$. Since the rotational speed of the drive shaft 210 is related to the rotational speed of the rotor 230, when the target part 212 and the drive shaft rotate according to the preset rule, the rotational speed of the target part 212 is related to the rotational speed of the rotor 230 so that the rotational speed of the rotor 230 can be detected by detecting the rotational speed of the target part 212.

The displacement sensor 720 may be located in the housing 100, mounted outside the electric motor 200, and not in contact with assemblies on the electric motor 200, that is, not in contact with the stator 220, the rotor 230, the drive shaft 210, and the target part 212 of the electric motor 200. The displacement sensor 720 may be a non-contact linear sensor and may be disposed near the target part 212 so that the displacement sensor 720 can detect the motion state information of the target part 212 and send the detected motion state information to the controller 710. In this manner, the controller 710 can control the working state of the electric motor 200 according to the motion state information provided by the displacement sensor 720.

In this example, the displacement sensor 720 may be an eddy current sensor. The eddy current sensor is used as the displacement sensor 720 for detecting the motion state of the rotor 230. Compared to a contact sensor, the eddy current sensor does not increase the load on the electric motor 200 and can provide very accurate data even in harsh environments. When the electric motor 200 is started in an overloading working condition or at a low rotational speed with a load, the current in the electric motor 200 is increased. When a magnetic encoder (for example, a Hall sensor) in the related art is used, since the current interferes with the magnetic field of the magnet, the sensor such as the magnetic encoder detects the motion state of the electric motor abnormally. The eddy current sensor is used so that the current interference with the magnetic field can be avoided, and the following problem can be solved: the electric motor 200 is susceptible to current interference in a large-current condition, causing false protection and starting with the load.

The motion state information of the target part 212 detected by the displacement sensor 720 may be the position information of the target part 212 so that the controller 710 can determine the position of the rotor 230 according to the position information of the target part 212 and output a driving control signal to the electric motor 200 according to the current position of the rotor 230, thereby relatively accurately controlling the electric motor 200. The displacement sensor 720 may collect the position information of one of the metal fan blades of the target part 212 so that the controller 710 can determine the position of the rotor 230 according to the position information of one metal fan blade. Alternatively, the displacement sensor 720 may collect the position information of multiple metal fan blades of the target part 212; in this case, the controller 710 determines the position of the rotor 230 in conjunction with the position information of the multiple metal fan blades.

The target part 212 is connected to or formed on the drive shaft 210 of the electric motor 200, and the target part 212 and the drive shaft 210 move according to the preset rule so that the motion state information of the rotor 230 in the electric motor 200 can be determined by detecting the motion state information of the target part 212. The eddy current sensor is used as the displacement sensor 720 for detecting the motion state information of the target part 212 so that the motion state information of the rotor 230 of the electric motor 200 can be detected, the load of the electric motor 200 can be reduced, very accurate data can be provided even in harsh environments, the current interference with the magnetic field can be avoided, and the following problem can be solved: the electric motor 200 is susceptible to current interference in a large-current condition, causing false protection and starting with the load. In this manner, the electric motor 200 can be controlled more accurately, which is conducive to improving the user experience.

For example, the eddy current sensor includes a transmitting coil and a receiving coil, where the transmitting coil emits an alternating excitation signal to generate an alternating magnetic field during the operation of the electric motor 200, and the receiving coil receives an electrical signal generated by the movement of the target part 212 in the alternating magnetic field and detects the position information of the target part 212 according to the electrical signal. The transmitting coil can transmit the alternating excitation signal, the alternating excitation signal generates an alternating electromagnetic field in space, and the receiving coil can receive the signal generated by the alternating electromagnetic field. The target part 212 induces the eddy current under the action of the alternating electromagnetic field, and the eddy current generates a secondary electromagnetic signal field. When the eddy current sensor and the target part 212 move relative to each other, the signal received by the receiving coil of the eddy current sensor changes. By demodulating and processing the received signal, the eddy current sensor can acquire the relative position between the eddy current sensor and the target part 212, that is, acquire the position information of the target part 212. In this case, the eddy current sensor outputs a corresponding signal, and the controller 710 controls the operation of the electric motor 200 based on the signal provided by the eddy current sensor.

In some examples, the eddy current sensor outputs a corresponding signal to the controller 710 by demodulating and processing the received motion state information of the target part 212.

For example, the alternating excitation signal emitted by the transmitting coil is a sinusoidal signal, and the electrical signal received by the receiving coil is a cosine signal. The eddy current sensor determines the position information of the target part 212 according to the sinusoidal signal and the cosine signal. The eddy current sensor can calculate the ratio of the outputted sinusoidal signal to the received cosine signal to acquire the tangent value and then directly obtain the corresponding arctangent function value through the table lookup method according to the tangent value. The arctangent function value is the position information (that is, the angle) of the target part 212. In this manner, the angle of the rotor 230 in the electric motor 200 can be further determined according to the preset rule between the target part 212 and the drive shaft 210.

In some examples, in conjunction with FIGS. 19 and 20, the impact wrench 10 further includes a first circuit board 730. In this example, the transmitting coil and the receiving coil of the eddy current sensor are disposed on the first circuit board 730. The controller 710 is disposed on a separate circuit board. In some examples, the transmitting coil and the receiving coil of the eddy current sensor and the controller 710 are all disposed on the first circuit board 730. In this manner, through the circuit design of the circuit board, the eddy current sensor can transmit the acquired position information to the controller 710 in the form of an electrical signal, thereby improving the reliability of information transmission.

In some examples, along the direction of the drive axis 101 of the drive shaft 210, the electric motor 200, the target part 212, and the first circuit board 730 are arranged in sequence. In this example, since the target part 212 is formed on or connected to the drive shaft 210, when the electric motor 200, the target part 212, and the first circuit board 730 are arranged in sequence along the direction of the drive axis 101, the first circuit board 730 and the target part 212 are both located on the drive axis 101 of the drive shaft 210 so that it is convenient for the eddy current sensor to collect the motion state information of the target part 212. For example, along the direction of the drive axis 101 of the drive shaft 210, the target part 212 may be located on a side of the electric motor 200 facing away from the output shaft 400, that is, on a side of the rear bearing 250 (or the fan) of the electric motor 200 facing away from the output shaft 400, and the target part 212 may be disposed at an end of the drive shaft 210 facing away from the output shaft 400. The output shaft 400 is usually used as the front end of the tool. In this case, the first circuit board 730 may be disposed at the position of the tail housing 113 of the tool so that the first circuit board 730 is opposite to the target part 212, and thus it is convenient for the eddy current sensor disposed on the first circuit board 730 to detect the motion state information of the target part 212.

For example, the first circuit board 730 may be fixed on the inner wall of the housing 100. In this manner, the position of the eddy current sensor can be fixed so that the positions of the eddy current sensor and the target part 212 are relatively fixed, thereby facilitating relatively accurate detection of the motion state information of the target part 212.

A control circuit is further included. FIG. 18 is a circuit diagram of a control circuit according to an example of the present invention. As shown in FIG. 18, the control circuit includes a driver circuit 740 and the controller 710. The driver circuit 740 is electrically connected to the stator windings U, V, and W of the electric motor 200 and is used for transmitting the current from the direct current power supply 800 to the stator windings U, V, and W so as to drive the electric motor 200 to rotate. In an example, the driver circuit 740 includes multiple switching elements Q1, Q2, Q3, Q4, Q5, and Q6. A gate terminal of each switching element is electrically connected to the controller 710 and is used for receiving a control signal from the controller 710. The drain or source of each switching element is connected to the stator windings U, V, and W of the electric motor 200. The switching elements Q1 to Q6 receive control signals from the controller 710 to change respective conduction states, thereby changing the current loaded to the stator windings U, V, and W of the electric motor 200 by the direct current power supply 800. In an example, the driver circuit 740 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches such as the IGBTs or the BJTs.

In this example, the controller 710 is used for controlling the electric motor 200. As shown in FIG. 3, the impact wrench 10 is provided with a second circuit board 750. In some examples, the second circuit board 750 is a main circuit board. The controller 710 may be disposed on the second circuit board 750 or the first circuit board 730. In this example, the first circuit board 730 and the second circuit board 750 include a printed circuit board (PCB) and a flexible printed circuit (FPC) board. The controller 710 adopts a dedicated control chip, for example, a single-chip microcomputer or a microcontroller unit (MCU). The controller 710 may control the direction of rotation of the electric motor 200 according to a steering switching signal provided by a switching portion 261 and may control the rotational speed of the electric motor 200 according to a signal provided by the main switch 260. On this basis, the rotational speed of the electric motor 200 can be further adjusted according to the motion state information provided by the displacement sensor 720. Specifically, the control chip controls the switching elements in the driver circuit 740 to be turned on or off. In some examples, the controller 710 controls the ratio of the on time of a drive switch to the off time of the drive switch based on a pulse-width modulation (PWM) signal. It is to be noted that the control chip may be integrated into the controller 710 or may be disposed independently of the controller 710. The structural relationship between a driver chip (a chip used for the integrated driver circuit 740) and the controller 710 is not limited in this example.

Based on the same inventive concept, the examples of the present invention further provide a rotary power tool. The rotary power tool includes a housing formed with an accommodation space; an output portion driven to output torque, where the output torque of the output portion is greater than or equal to 500 foot-pounds; the electric motor 200 disposed in the accommodation space and including the stator and the rotor 230; the drive shaft 210 formed on or connected to the rotor 230, where the electric motor 200 drives the output portion through the drive shaft 210; the target part 212 formed on or connected to the drive shaft 210, where the target part 212 moves synchronously with the drive shaft 210; an eddy current sensor used for detecting the motion state information of the target part 212 and disposed on the outer side of the electric motor 200; and the controller 710 configured to control the working state of the electric motor 200 according to the motion state information provided by the displacement sensor 720. The eddy current sensor is used to detect the motion state information of the rotor 230 of the electric motor 200 so that the load of the electric motor 200 can be reduced, very accurate data can be provided even in harsh environments, and the following problem can be solved: the electric motor 200 is susceptible to current interference in a large-current condition, causing false protection and starting with the load.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

What is claimed is:

1. An impact tool, comprising:
- a housing;
- a motor comprising a drive shaft that rotates about a first axis, where the drive shaft optionally rotates in a first direction or a second direction;
- an output shaft for outputting a tightening torque greater than or equal to 700 foot-pounds; and
- an impact assembly that provides an impact force to the output shaft;
- wherein the impact assembly comprises a main shaft driven by the motor and rotating about a main shaft axis, an impact block supported on the main shaft and rotating integrally with the main shaft, a hammer anvil mating with the impact block and struck by the impact block, and a rolling ball connecting the main shaft to the impact block, a main shaft ball groove is provided on the main shaft and comprises a first ball groove that extends spirally about the main shaft axis and is concave on an outer surface and a second ball groove that extends spirally about the main shaft axis and is concave on the outer surface, the impact block is provided with an impact ball groove that mates with the main shaft ball groove to accommodate the rolling ball, the impact ball groove comprises a third ball groove that mates with the first ball groove to accommodate the rolling ball and a fourth ball groove that mates with the second ball groove to accommodate the rolling ball, an included angle α between the first ball groove and the second ball groove is less than an included angle β between the third ball groove and the fourth ball groove, and the included angle α between the first ball groove and the second ball groove is less than 117°.

2. The impact tool of claim 1, wherein the included angle α between the first ball groove and the second ball groove is greater than 100° and less than 117°.

3. The impact tool of claim 1, wherein the included angle β between the third ball groove and the fourth ball groove is greater than 118° and less than 130°.

4. The impact tool of claim 1, wherein, when the impact block rotates in the first direction, the rolling ball moves in the first ball groove and the third ball groove, and, when the impact block rotates in the second direction, the rolling ball moves in the second ball groove and the fourth ball groove.

5. The impact tool of claim 1, wherein a diameter of a portion of the main shaft with the main shaft ball groove is greater than and equal to 22 mm.

6. The impact tool of claim 1, wherein the impact assembly further comprises an elastic element that provides a force for the impact block to approach the hammer anvil, and two ends of the elastic element are separately connected to an abutting surface of the main shaft and the impact block.

7. The impact tool of claim 6, wherein a coefficient of elasticity K of the elastic element is greater than or equal to 81 N/mm.

8. The impact tool of claim 6, wherein the impact block reciprocates forward and backward along the main shaft axis relative to the main shaft while rotating on the main shaft, the impact block comprises a first position at a farthest end of forward movement of the impact block and a second position at a farthest end of backward movement of the impact block, and the impact block located at the first position is engaged with the hammer anvil.

9. The impact tool of claim 8, wherein, when the impact block is located at the second position, a distance L2 between an end of the impact block facing the abutting surface and the abutting surface is less than or equal to 4 mm.

10. The impact tool of claim 8, wherein an axial stroke H1 of the impact block on the main shaft is greater than or equal to 14 mm and less than or equal to 20 mm.

11. The impact tool of claim 1, wherein the motor comprises a stator and a rotor, the drive shaft is formed on or connected to the rotor, the stator comprises a stator core and coil windings disposed on the stator core, and a length of the stator core is less than 18 mm.

12. The impact tool of claim 11, further comprising a displacement sensor that detects motion state information of a target part, wherein the displacement sensor is disposed in an accommodation space, the displacement sensor is an eddy current sensor, the target part is formed on or connected to the drive shaft, and the target part and the drive shaft move according to a preset rule.

13. The impact tool of claim 12, further comprising a controller configured to control a working state of the motor according to the motion state information provided by the displacement sensor, wherein the motion state information comprises position information of the target part, and the controller is further configured to determine a position of the rotor according to the position information of the target part.

14. The impact tool of claim 1, further comprising a battery pack, wherein the battery pack supplies power to the motor.

15. The impact tool of claim 1, wherein a holding portion for holding a sleeve is formed on or connected to a front end of the output shaft, and a length L1 from a rear end of the housing to a front end of the holding portion is less than or equal to 210 mm.

16. An impact tool, comprising:

a housing comprising a first housing and a second housing, wherein rear end surfaces of the first housing and the second housing define a rear end of the housing;

a motor supported by at least the first housing and the second housing and comprising a drive shaft for outputting power;

a direct current power supply that supplies power to the motor;

an output shaft having a holding portion for holding a sleeve formed on or connected to a front end of the output shaft and outputting a tightening torque greater than or equal to 700 foot-pounds;

an impact assembly used for providing an impact force to the output shaft; and a transmission assembly used for transmitting the power outputted by the drive shaft to the impact assembly and disposed between the motor and the impact assembly;

wherein the impact assembly comprises a main shaft driven by the motor and rotating about a main shaft axis, an impact block supported on the main shaft and rotating integrally with the main shaft, a hammer anvil mating with the impact block and struck by the impact block, and a rolling ball connecting the main shaft to the impact block, the main shaft is provided with a main shaft ball groove, the impact block is provided with an impact ball groove that mates with the main shaft ball groove to accommodate the rolling ball, and a length L1 from the rear end of the housing to a front end of the holding portion is less than or equal to 210 mm.

17. An impact tool, comprising:

a housing;

a motor accommodated in the housing and comprising a drive shaft for outputting power;

an output shaft for outputting a tightening torque greater than or equal to 700 foot-pounds;

an impact assembly used for providing an impact force to the output shaft; and a transmission assembly used for transmitting the power outputted by the drive shaft to the impact assembly and disposed between the motor and the impact assembly;

wherein the impact assembly comprises a main shaft driven by the motor and rotating about a main shaft axis, an impact block supported on the main shaft and rotating integrally with the main shaft, a hammer anvil mating with the impact block and struck by the impact block, and a rolling ball connecting the main shaft to the impact block, the main shaft is provided with a main shaft ball groove, the impact block is provided with an impact ball groove that mates with the main shaft ball groove to accommodate the rolling ball, and a length L1 from a rear end of the housing to a front end of the output shaft is less than or equal to 210 mm.

18. The impact tool of claim 17, wherein the housing comprises a barrel at least partially accommodating the motor; and a tail housing connected to a rear side of the barrel, wherein the tail housing holds a rear bearing for supporting a rear end of the drive shaft, and a rear side surface of the tail housing is defined as the rear end of the housing.

19. The impact tool of claim 17, further comprising a battery pack, wherein the battery pack supplies power to the motor.

20. The impact tool of claim 19, wherein a weight of the impact tool without the battery pack is defined as a bare weight of the impact tool, and a ratio of the tightening torque to the bare weight of the impact tool is greater than or equal to 152 foot-pounds per pound.

* * * * *